United States Patent [19]

Anderson et al.

[11] 3,758,724

[45] Sept. 11, 1973

[54] BUSY LINE CONTROL FOR SWITCHING SYSTEM

[75] Inventors: Frank H. Anderson, Orchard Park; Louis J. Cerny, Long Island City, both of N.Y.; James J. Murphy, Teaneck; John C. Sieglinger, Short Hills, both of N.J.

[73] Assignee: American Telephone and Telegraph Corporation, New York, N.Y.

[22] Filed: Dec. 20, 1971

[21] Appl. No.: 209,616

[52] U.S. Cl. .......... 179/18 AB
[51] Int. Cl. .......... H04m 3/22
[58] Field of Search .......... 179/18 AB, 18 EB

[56] References Cited

UNITED STATES PATENTS

| | | | |
|---|---|---|---|
| 3,532,830 | 10/1970 | Wirsing | 179/18 AB |
| 3,480,735 | 11/1969 | Mnichowicz et al. | 179/18 AB |

*Primary Examiner*—Thomas W. Brown
*Attorney*—N. S. Ewing, W. L. Kiefauver et al.

[57] ABSTRACT

A crossbar telephone switching system wherein one of a number of markers, under the control of a called directory number registered therein, seizes a number group circuit and causes the number group circuit to translate the called number into the equipment location of the called line, the nature (class) of the called line, and the busy-idle condition of the called line. If the called line is found to be busy at a time when all markers are busy, the marker connects to a common register, registers therein the busy called number, releases from the common register, and initiates the usual busy-back switching function. All other markers having then registered therein called numbers requiring number group translation and busy-idle testing connect to the common register and compare their called numbers with the called number in the common register. Any marker having a matching called number releases from the common register and initiates a busy-back switching function without seizing a number group circuit for translation and without performing line testing. Any marker not having a matching number releases from the common register and seizes a number group circuit in the normal manner. After a suitable time delay to allow all markers to finish the comparison of called numbers, the common register clears itself of the called number registered therein and renders itself available for another such use.

16 Claims, 23 Drawing Figures

PATENTED SEP 11 1973 3,758,724

SHEET 01 OF 21

FIG. 2 (SENDER-MARKER CONNECTION)

(MARKER CONTROL)

(MARKER CONTROL)

(MARKER BUSY)

(MARKER NUMBER REGISTER)

(MARKER NUMBER REGISTER)

(MARKER-SLEEVE RELAY)

(MARKER BUSY-TEST & LINE SELECTION)

(MARKER-THOUSANDS-REGISTER-CHECK)

(MARKER-HUNDREDS-REGISTER-CHECK)

(MARKER-TENS-REGISTER CHECK)

( MARKER-UNITS-REGISTER-CHECK )

(OVERLOAD-TIMING-CONTROL)

(OVERLOAD-TIMING-CONTROL)

(OVERLOAD-REGISTER CONNECTOR)

(OVERLOAD-CHECK CONNECTOR)

(OVERLOAD - THOUSANDS)

(OVERLOAD-HUNDREDS)

(OVERLOAD-HUNDREDS)

(OVERLOAD-TENS)

(OVERLOAD-TENS)

(OVERLOAD-UNITS)

BUSY LINE CONTROL FOR SWITCHING SYSTEM

BACKGROUND OF THE INVENTION

1. Field of the Invention

The field of the present invention is generally telephone switching systems and more particularly automatic telephone switching systems wherein a plurality of common control circuits are used to ascertain the busy-idle conditions of called lines preparatory either to effecting connections to idle called lines or to initiating busy-back switching functions if called lines are busy.

2. Description of the Prior Art

In telephone switching systems it sometimes occurs that an abnormal volume of calls may be directed to a particular called line. A radio or television show may be soliciting charitable contributions and may announce a particular directory number for contributors to call. Also, during some types of emergencies or catastrophies, police or hospital or emergency service lines may receive an abnormal volume of calls. Other such situations may arise such as to possibly cause serious overloading, or even blockage at times, of the switching control circuitry in its attempts to repeatedly complete connections to the same busy line or lines.

In the context of the above potentially troublesome situations, provision has priorly been made in automatic switching control to shorten the time normally required to process calls to such called lines. Sometimes system management can anticipate such trouble regarding a particular line. At other times, when a switching office may become overloaded with calls to a particular line, traffic engineering people can identify the particular line. In such circumstances, manually settable devices have been provided to adjust the switching controls to cancel some normal switching functions whenever such a particular called number is being processed. For instance, the so-called No. 1 Crossbar Switching System manufactured by the Western Electric Company and used by the operating companies of the Bell System, an early version of which is disclosed in part in U.S. Pat. No. 2,232,371 to Joseph W. Dehn and Oscar Myers of Feb. 18, 1941 (hereinafter referred to as Dehn et al.), has been modified by jack panels so that a particular called number may be manually set-up by inserting certain plugs in certain jacks of the panels so as to "plug-up" a particular called number. Under such circumstances, whenever a terminating marker encounters busy condition on that particular called line, all other markers then having the same called number registered therein are advanced to their busy-back switching function mode without the necessity of first making individual busy-call tests on that line, thus considerably shortening the holding time of such important circuits.

While the above-mentioned manually operated busy line control arrangement has proven quite useful, only one called number may be controlled at one time and the administrative attention required by plant personnel to change from one number to another consumes time which might be used more advantageously elsewhere.

The above two disadvantages of the prior manually administered busy line control have presented at least two problems to those skilled in the art. One problem has been how to enable such control with regard to any and all called numbers without materially affecting the basic switching control functions. The other problem has been how to fully automate such a comprehensive control so as to eliminate or considerably reduce the amount of necessary administrative assistance.

SUMMARY OF THE INVENTION

It is the basic object of the present invention to eliminate the above two disadvantages of the prior manually operated busy line control by allowing fully automatic busy line control for any and all called numbers or designations without the necessity for administrative assistance.

This object is attained by circuitry of the present invention which provides means automatically controlled by any switching control circuit having registered therein any called line designation, such as all or part of a called directory number, upon ascertaining a busy condition on the called line identified by the registered number, for informing all other control circuits of the busy condition so that any such other circuit having the same called number registered therein need not take the time to ascertain the busy-idle condition of the same line.

A particular feature of the present invention, whereby the above object is attained, is the provision of a register or recorder common to all control circuits, means controlled by any control circuit for registering in the common register (or recording in the common recorder) the called number identifying a busy called line, means controlled by any other control circuit which has not as yet tested a called line for its busy-idle condition for comparing its registered called number with the busy line number registered in the common register, and means in any such other control circuit effective if the comparison produces a match of numbers for canceling the busy-idle condition ascertaining or testing function in such other control circuit.

A specific feature of the invention is the provision of circuitry which permits the automatic busy line control to function whenever all control circuits are busy.

Another specific feature of the invention is the provision of circuitry which establishes a prescribed time interval during which all control circuits may perform their comparing functions and at the end of which time interval the common register clears itself (the recording or registration is deleted) so as to be available for another use.

Still another specific feature of the invention is the provision of circuitry for allowing a plurality of control circuits to perform their comparing functions concurrently.

BRIEF DESCRIPTION OF THE DRAWING

FIG. 2 shows the circuitry whereby the called number is registered in a marker;

FIGS. 3 and 4 show some of the marker control circuitry;

FIG. 5 shows marker circuitry for deriving marker busy information;

FIGS. 6 and 7 show some additional marker number register circuits;

FIG. 8 shows some details of the marker sleeve relay circuitry;

FIG. 9 shows some details of the marker busy test and line selection circuitry; and, FIGS. 10 through 13 show details of the marker for comparing its registered number against the number in the overload register circuitry of FIGS. 18 through 23.

FIGS. 14 and 15 show timing control circuits;

FIGS. 16 and 17 show the register connectors and the check or matching connectors;

FIG. 18 shows the overload thousands digit register;

FIGS. 19 and 20 show the overload hundreds digit register;

FIGS. 21 and 22 show the overload tens digit register; and,

FIG. 23 shows the overload units digit register.

GENERAL DESCRIPTION

The following general description is arranged in three parts with suitable headings as follows: Incorporation by Reference of Dehn et al.; Circuit Symbols and Conventions; and, The Block Diagram.

Incorporation by Reference of Dehn et al.

The disclosure of Dehn et al. is incorporated herein by reference just as through fully disclosed herein. As is well known in the art, the No. 1 Crossbar system is divided into originating office circuitry using originating markers and terminating office circuitry using terminating markers. Dehn et al. discloses the details of a terminating office wherein terminating markers are used to receive called numbers from terminating senders, to consult number group circuits for line location, line class and line busy-idle data regarding the terminating lines identified by the called numbers, to complete switch connections to idle terminating lines, and to perform busy-back switching functions if called terminating lines are found to be busy. The well-known busy-back switching function amounts essentially to returning a busy signal toward the originating end of the calling connection.

Sufficient details of Dehn el al have been included in the present circuit drawing so that detailed reference to Dehn et al may be necessary only for understanding the detailed functioning of an unmodified terminating office. Such understanding is assumed to exist as a point of departure for understanding the terminating office modified according to the present invention to mechanize random busy line overload control.

CIRCUIT SYMBOLS AND CONVENTIONS

Most of the symbols and conventions used in the detailed circuitry are standard. Two symbols have been chosen with special features in order to clarify new circuit parts from old circuit parts. A circle with the letters "SUB" inside represents the usual subscriber station, such as on FIG. 1 and FIG. 8.

A small circle with a minus sign inside represents the negative terminal (positive terminal assumed to be grounded) of the central office battery supply (usually 48 volts direct current).

The well-known detached contact type of schematic is used. A small "x" across a circuit line represents a pair of relay make (or front) contacts which are open when the relay is released and which are closed when the relay is operated, such as contact S(S1)3204–R3 in FIG. 3. A small dash perpendicular to a circuit line represents a pair of relay brake (or back) contacts which are closed when the relay is released and which are open when the relay is operated, such as contact CK2(M1)2807–B2 in FIG. 6. The well-known transfer contact arrangement is the combination of the make and break contact symbols, such as transfer contacts CK4(M1)2803–T2 of FIG. 3.

Figure 2:
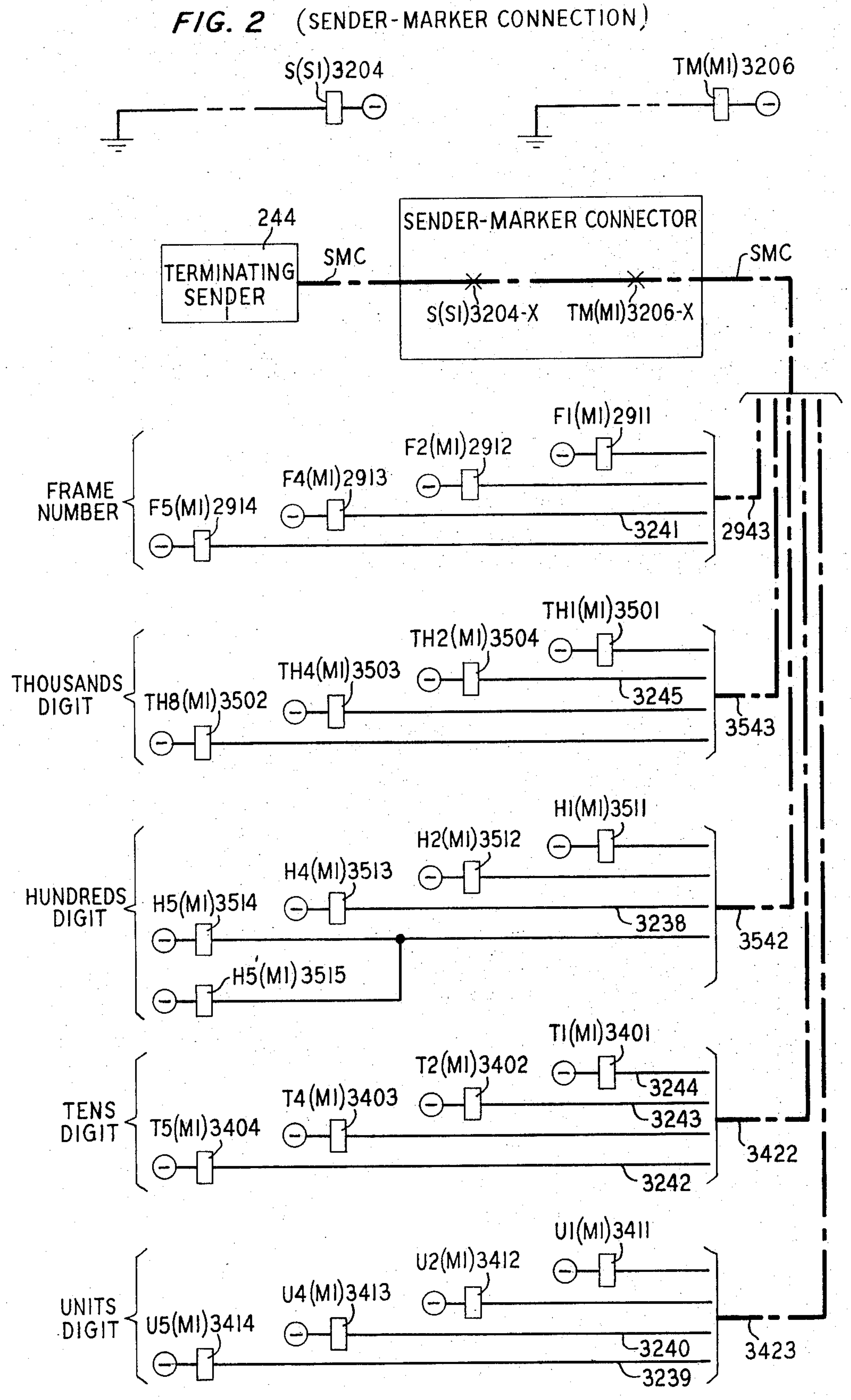
FIGS. 2 through 13 show circuit details of the markers and of the sender and number group connectors as follows.
Figure 6:
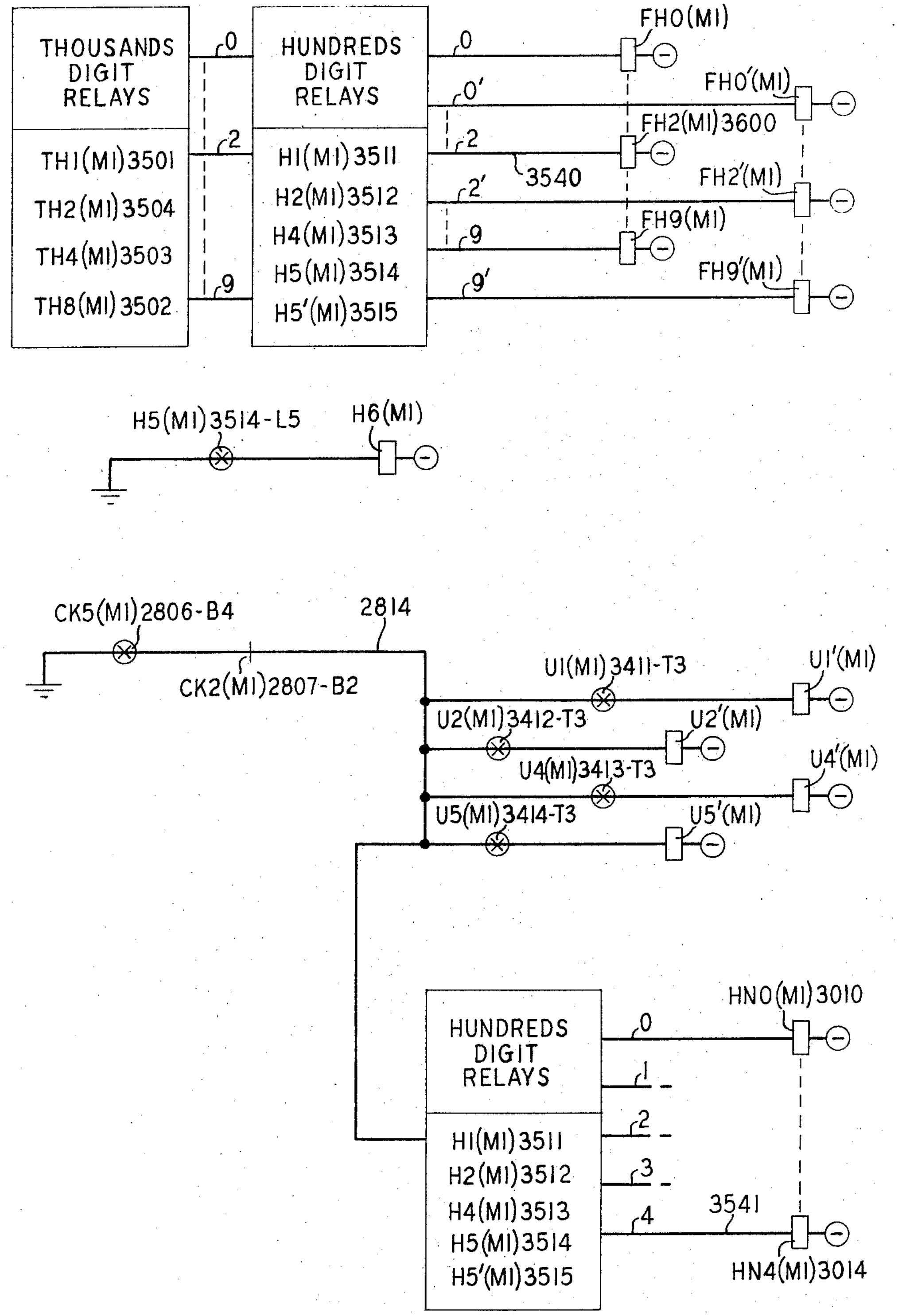

Dashes are used to signify omissions of circuit detail. A dashed portion of a circuit line, such as between ground and the winding of relay S(S1)3204 in FIG. 2, represents the presence of additional (but not shown) circuitry not of significance to the understanding of the present disclosure. Dashed lines between circuit lines and between relays, such as in FIG. 6, represent obvious continuations of additional lines and relays where the showing of such obvious additional detail is unnecessary.

A combination of reference letters and numerals is used in an effort to identify parts of Dehn et al., parts added to Dehn et al., and entirely new circuits. The reference symbols in Dehn et al. are numbers where the first digit or pair of digits identifies the FIG. number of Dehn et al. where the circuit element appears, such as relay 203 of FIG. 2 of Dehn et al. and relay 1101 of FIG. 11 of Dehn et al., or where the circuit element originates, such as lead 224 of FIG. 2 of Dehn et al and lead 1142 of FIG. 11 of Dehn et al. Wherever possible, these same numbers are included in the present circuitry to identify the same parts of Dehn et al., such as the number 2911 as part of the reference numeral of relay F1(M1)2911 in the present FIG. 2 to identify the same relay as relay 2911 in FIG. 29 of Dehn et al. Circuit leads or cables, such as lead 3241 and cable 2943 in FIG. 2 of the present drawing represent, respectively, lead 3241 in FIG. 32 of Dehn et al. and cable 2943 in FIG. 29 of Dehn et al. Functional lettering has been added to relays, etc. of the present showing even though such functional designations are not included in Dehn et al. For instance, in the present FIG. 2, relay S(S1)3204 represents the S connector of sender S1 and which is identified in FIG. 32 of Dehn et al. as 3204; in the present FIG. 2, relay F1(M1)2911 is the F1 relay in marker M1 and which is identified in FIG. 29 of Dehn et al. as 2911. Where a new relay, etc. has been added to mechanize the present overload control, such as relay CK10(M1) of the present FIG. 3, such designation identifies relay CK10 of marker M1, but no number is included since Dehn et al. contains no such component. An additional circuit lead, such as lead MP1 in FIG. 3 of the present drawing, contains no number as part of its reference numeral since that lead does not exist in DEHN et al. Relay contacts of Dehn et al., such as contact S(S1)3204–R3 in the present FIG. 3, includes an additional reference numeral part, such as the "R3"; this identifies the right-hand number 3 contact of relay 3204 in FIG. 32 of Dehn et al.; similarly, such additional reference parts as "T1", "B1", "L1", etc. identify top, bottom and left-hand contact of Dehn et al depending upon the orientation of the relay contacts in the Dehn et al. disclosure. In a few instances, such as contact MCA(M1)506-514 in the present FIG. 4, the "514" identifies the contact number of relay (or connector) 506 in FIG. 5 of Dehn et al., and which is the MCA connector for marker M1.

Figure 14:
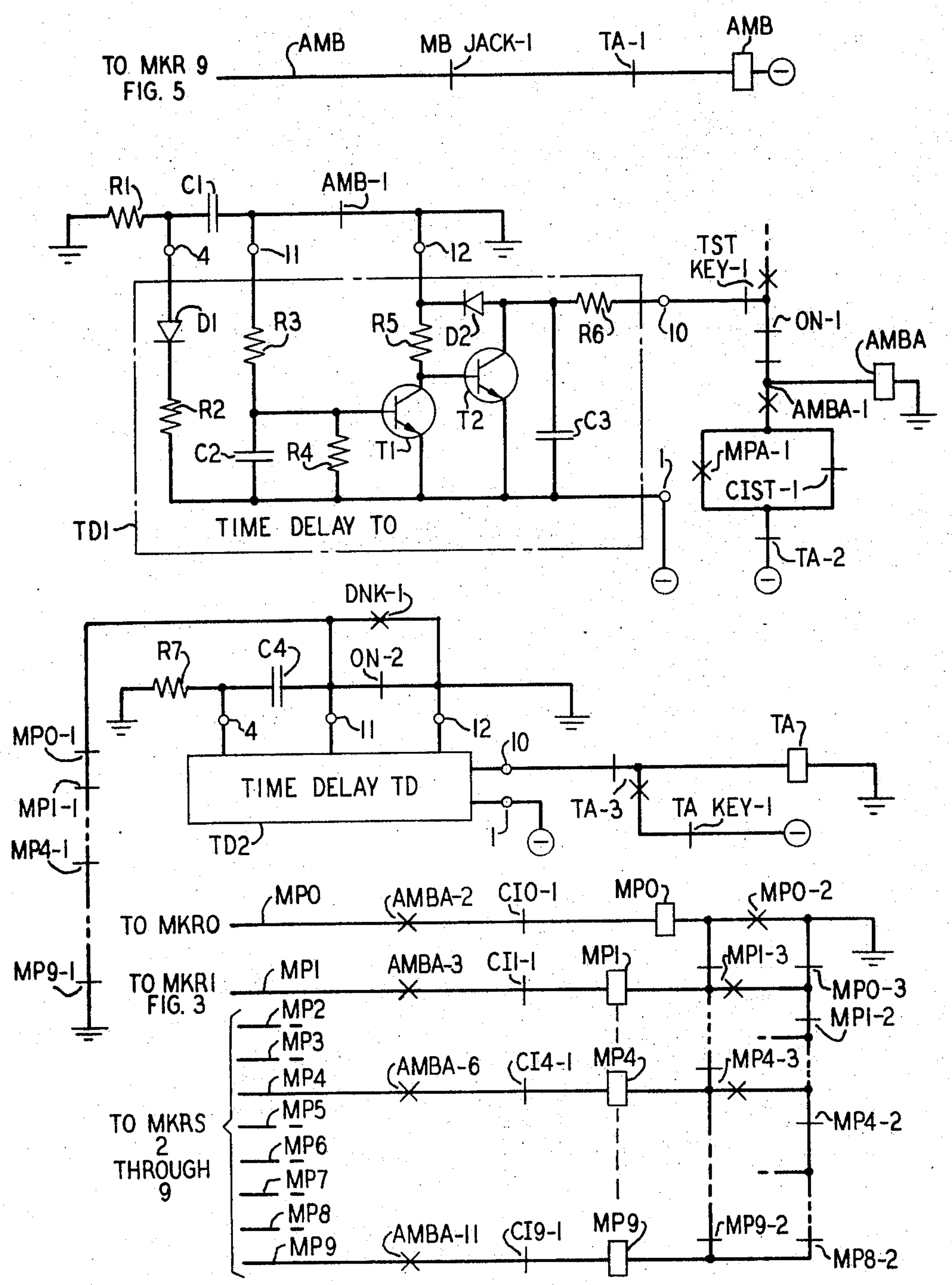
FIGS. 14 through 23 show circuit details of the overload control as follows.

While details are shown for one marker, such as marker M1, certain relays are shown of the other markers M0 and M2 through M9, such as relays MP0, MP4 and MP9 of the present FIG. 14. Contacts of relays of such other markers are similarly designated, such as contacts AMB(M0)-1, AMB(M4)-1 and AMB(M9)-1 of the present FIG. 5 to designate the No. 1 contacts of those relays.

Wherever contacts have been added to the existing relays of Dehn et al. or wherever contacts are shown for relays added to the Dehn et al. marker circuitry, such contacts have been shown in the usual detached contact fashion but with small circles enclosing the contact symbol. For instance, in FIG. 3, contact NK1(M1)2901-R4 is a break contact added as the right-hand No. 4 contact to relay 2901 in FIG. 29 of Dehn et al. and which is the NK1 relay of marker M1. Also in FIG. 3 contact BBA(M1)-1 is make contact No. 1 of new relay BBA in marker M1. In like manner in FIG. 5, transfer contact DB(M1)-1 is a make-break transfer of new relay DB in marker M1. This variation is used throughout FIGS. 2 through 13 making up the significant parts or modified parts of the Dehn et al. disclosure.

FIGS. 14 through 23 represent completely new overload circuitry added to the Dehn et al. disclosure and are shown in the conventional detached contact manner since there is no need to distinguish the new elements from non-existent (regarding Dehn et al.) elements.

One additional symbol may be referred to for clarity reasons. In FIG. 2, cables 2943, 3543, 3542, 3422 and 3423 of Dehn et al have been bunched into one new cable SMC extending from the number register relays of the marker to the terminating sender 244 through make contacts of the sender-marker connectors TM(M1)3206 and S(S1)3204. The make contacts TM(M1)3206-*x* and S(S1)3204-*x* signify, by means of the "x", that a large number of such make contacts are involved, such as are necessary to provide for the 20 separate register relay leads.

Figure 3:
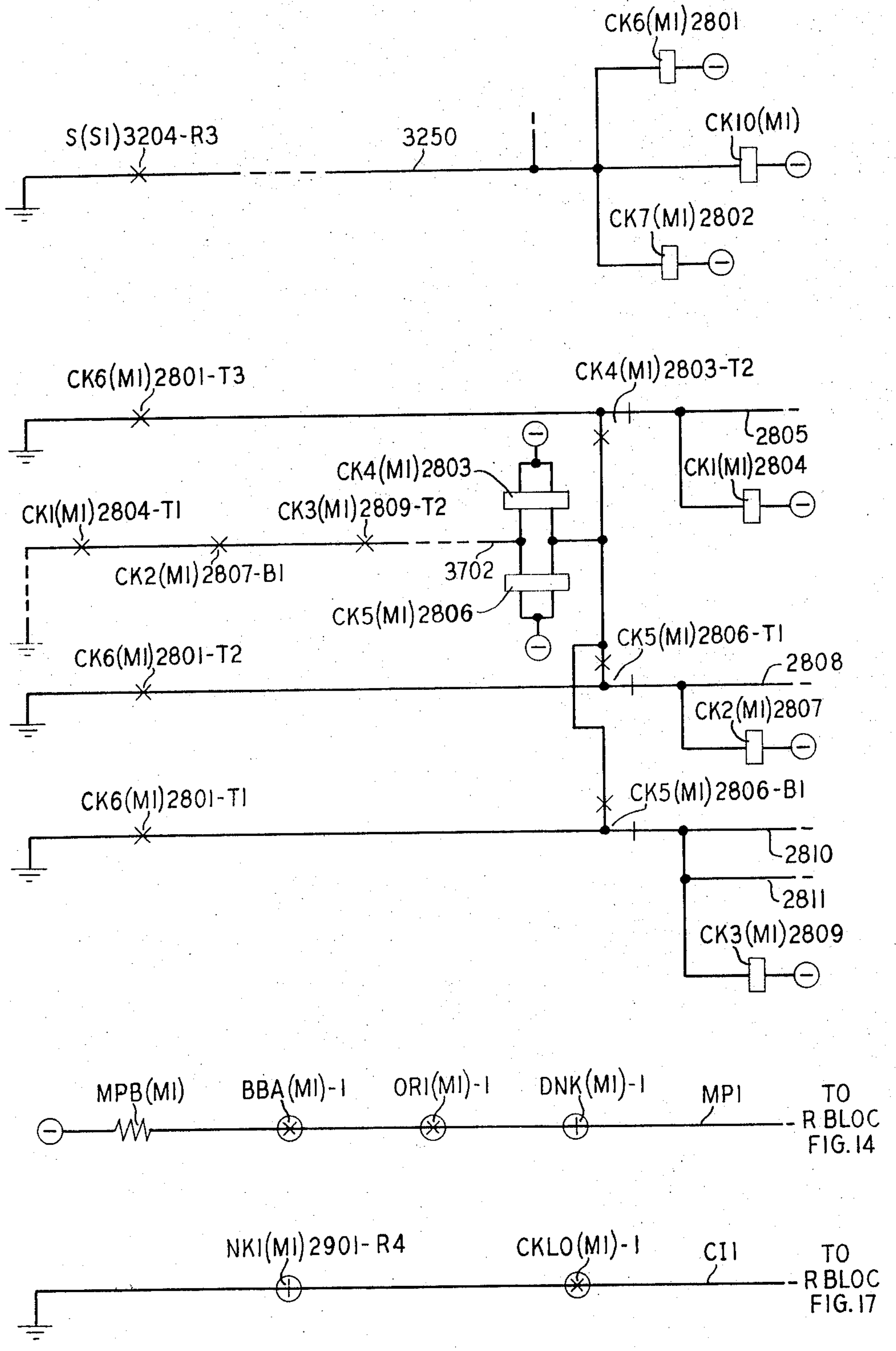

In some instances certain leads are shown disconnected from undisclosed circuitry, such as in FIG. 3 where the Dehn et al. leads 2805, 2808, 2810, etc. are indicated. Such designation is provided merely as an aid in identifying the present circuitry with the Dehn et al. disclosure.

THE BLOCK DIAGRAM

Figure 1:
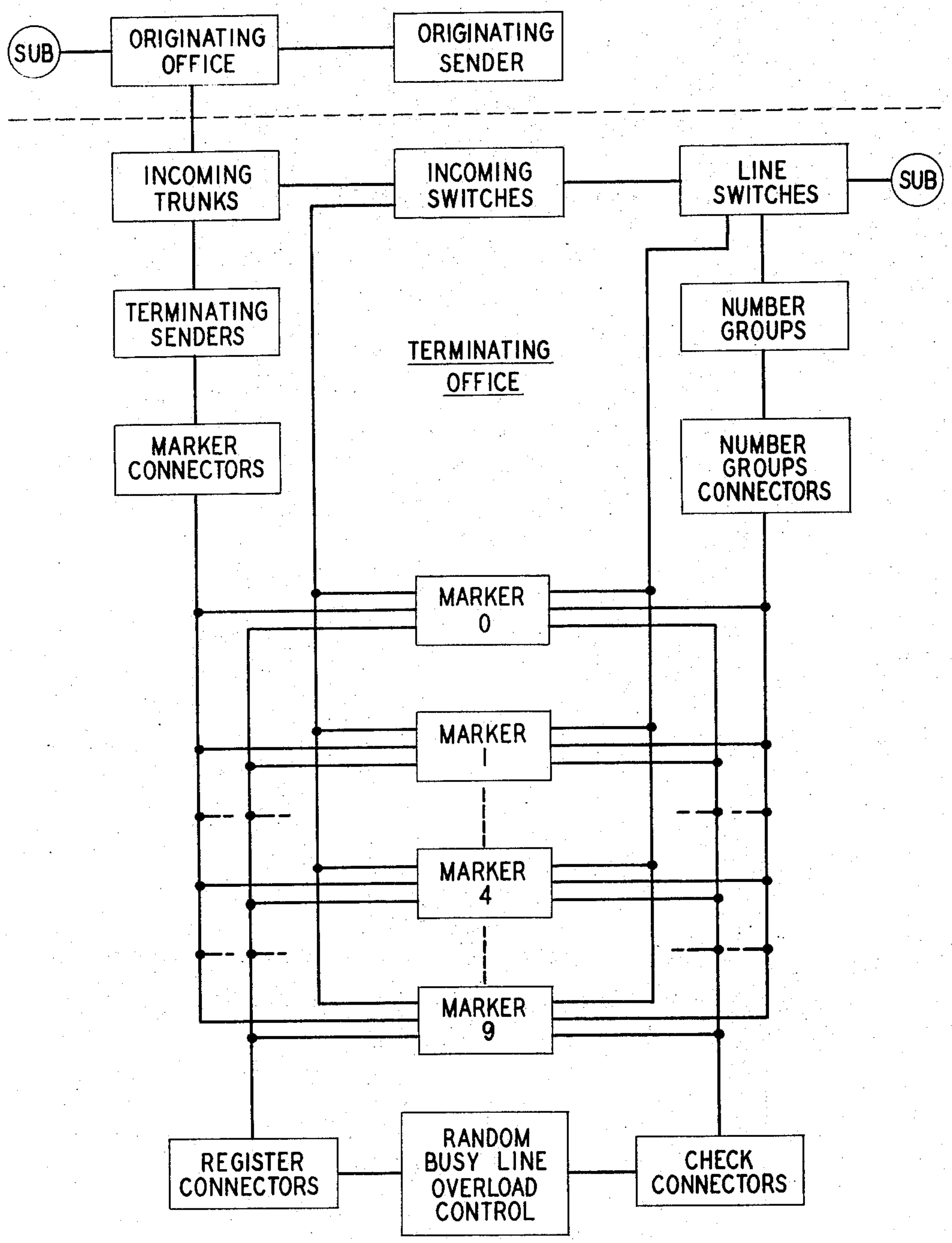
FIG. 1 is a block diagram showing the general functional arrangement of basic parts of a No. 1 Crossbar automatic telephone switching system, including an originating office and a terminating office, with the terminating office involving 10 terminating markers arranged to implement the random busy line overload control features of the present invention, details of which are shown in FIGS. 2 through 23.

The block diagram of FIG. 1 shows the basic functional parts of Dehn et al. and the general functional manner in which the Register Connectors, Check Connectors and Random Busy Line Overload Control are connected to Dehn et al. to mechanize the busy line control features of the present invention.

A call from a subscriber in an originating office is forwarded to a terminating office by an originating sender. The originating sender may forward any number of called digits, such as four, seven, ten, etc. depending upon the situation. Where the called line terminates in the terminating office, the usual situation, as assumed in the present case, is for the originating sender to forward the four numerals of the called directory number; i.e., the TH (thousands), H (hundreds), T (tens) and U (units) digits of the complete called directory number. As is well known, the complete called number may involve seven digits (ABC-TH,H,T,U) or ten digits (NPA-ABC-TH,H,T,U) etc. where ABC is the terminating office code and NPA is the national numbering plan area. There may even be more digits involved, such as might occur if international codes were added ahead of the NPA code. For present purposes, it is assumed that the four numerals are received by a terminating sender at the terminating office wherein the called line is terminated. An incoming trunk is used from the originating office to the terminating office for handling the inter-office transmission.

When the terminating sender has received the called number over the incoming trunk, the sender connects to an idle marker through a marker connector and transfers to the marker (during the register mode marker switching function) the called number along with the switching network location of the incoming trunk. The marker thereafter advances to its test start mode of operation preparatory to testing the busy-idle condition of the called line. The marker seizes a number group circuit (to thus advance to its test mode switching function) through a number group connector (according to a marker translation of part of the called number), transmits the called number to the number group circuit, and receives from the number group circuit an indication of the network location of the called line, the nature (such as the class) of the called line, and the busy-idle condition of the called line.

After the marker has received the translation information from the number group, the marker connects with the incoming switches. If the called line is idle, the marker advances to its line selecting mode and connects with the line switches, interconnects the incoming trunk with the called line, initiates ringing on the called line, and releases, the terminating sender and number group connections being released during the course of setting up the terminating connection. If the called line is busy, the marker advances to its busy-back mode and initiates a busy-back switching function which results in busy tone being applied over the incoming trunk rearward toward the calling end of the connection, the sender and marker being released in the course of the busy-back switching job.

The above process is the normal operation of the Dehn et al. system. This means that if the called line happens to be busy rather constantly each marker must needlessly go through the number group switching function (the testing mode), etc. for each call to the busy line. According to features of the present invention, the Random Busy Line Overload Control of FIG. 1 is added, along with the Register Connectors, the Check Connectors, and certain modifications to the markers. The net effect of such changes and additions to Dehn et al eliminates the needless repeated number group switching functions (the testing modes) of markers encountering potential network blockage due to a particular called line being rather constantly busy.

The busy line overload control is brought into play whenever all markers are busy at the same time. Of course, it will be obvious that any desired starting condition could be mechanized, such as whenever some fixed percentage of markers is busy, or such as at all times regardless of whether any other markers are busy or not. The most serious potential network blockage situation prevails whenever all markers are busy at the same time, so that condition is used in the exemplary embodiment as a starting condition.

Another starting condition, which again may be eliminated or changed as desired, is to measure an interval of time, such as from 2 to 6 seconds, during which all markers are concurrently busy. With this added factor, the automatic busy line control will not be brought into play unless all markers are busy for a prescribed interval of time.

Assuming a starting condition to prevail, whatever it may be, if any marker finds any called line busy as a result of its normal number group switching function, a register (or recorder) connector will be operated whereby the marker, while in its busy-back mode, will register in the busy line overload circuit the TH, H, T and U digits of that busy called line. That marker then releases the register connector and proceeds to perform its normal busy-back switching function. When the register connector is released, all other markers which have called numbers then registered therein and which are then ready to perform their normal number group switching and line testing functions, will simultaneously operate check or match connectors while in their test start modes. The connections through the check connectors from the markers to the register in the busy line control circuitry allow the markers to compare their then registered called numbers with the called number previously registered in the busy line control circuitry.

Any marker having a called number which does not match the called number in the busy line control circuitry will release from the busy line control circuitry so as to then proceed to perform its normal number group switching and line testing functions.

Any marker having a called number which matches the called number in the busy line control circuitry will cancel or eliminate its normal number group switching and line testing functions and will at once proceed to perform a busy-back switching function with respect to the call to that called number.

Beginning approximately at the time that the check or match connectors are operated, measurement of a prescribed time interval is started. The time interval is chosen as about 200 ms (milliseconds), which is sufficient time for all markers to have finished their called number comparing functions and to have proceeded either to busy-back switching functions or to normal number group switching functions. At the end of the 200 ms interval, the busy line control circuitry will release its called number registration (delete the number recording) and will return to a completely released condition awaiting another use.

The busy line control circuitry is arranged, when released for reuse, to cancel the two (2)-to-six (6) second initial timing if at that time all markers are still busy. This feature may or may not be considered necessary or desirable in a particular use of the present busy line control arrangement.

DETAILED DESCRIPTION

The following detailed description of the circuit drawing of FIGS. 2 through 23 assumes an understanding of the operation of Dehn et al. as a prior art point of departure. The detailed description is arranged in several sections having headings as follows: *Sender to Marker Connection; Marker Busy, Number Transfer Validity Check; Sender to Marker Number Registration; Number Group Seizure; Called Line Idle; Called Line Busy; All Markers Busy; Overload Control Initial Timing; Marker Seizes Overload Control; Time-Out Alarm; Marker Registers Called Number in Overload Control; Marker M1 Disconnects from Overload Control; Marker M1 Finishes Busy-Back Switching Function; Other Markers in Number Group Queueing Mode; Markers Operaie Overload Check Connectors; Connected Markers Compare Registered Called Numbers; Marker M1 Finds Number Match; Marker M1 Forced to Busy-Back Mode; Other Markers;* and, *Overload Control Returns to Normal.*

SENDER TO MARKER CONNECTION

Figure 4:
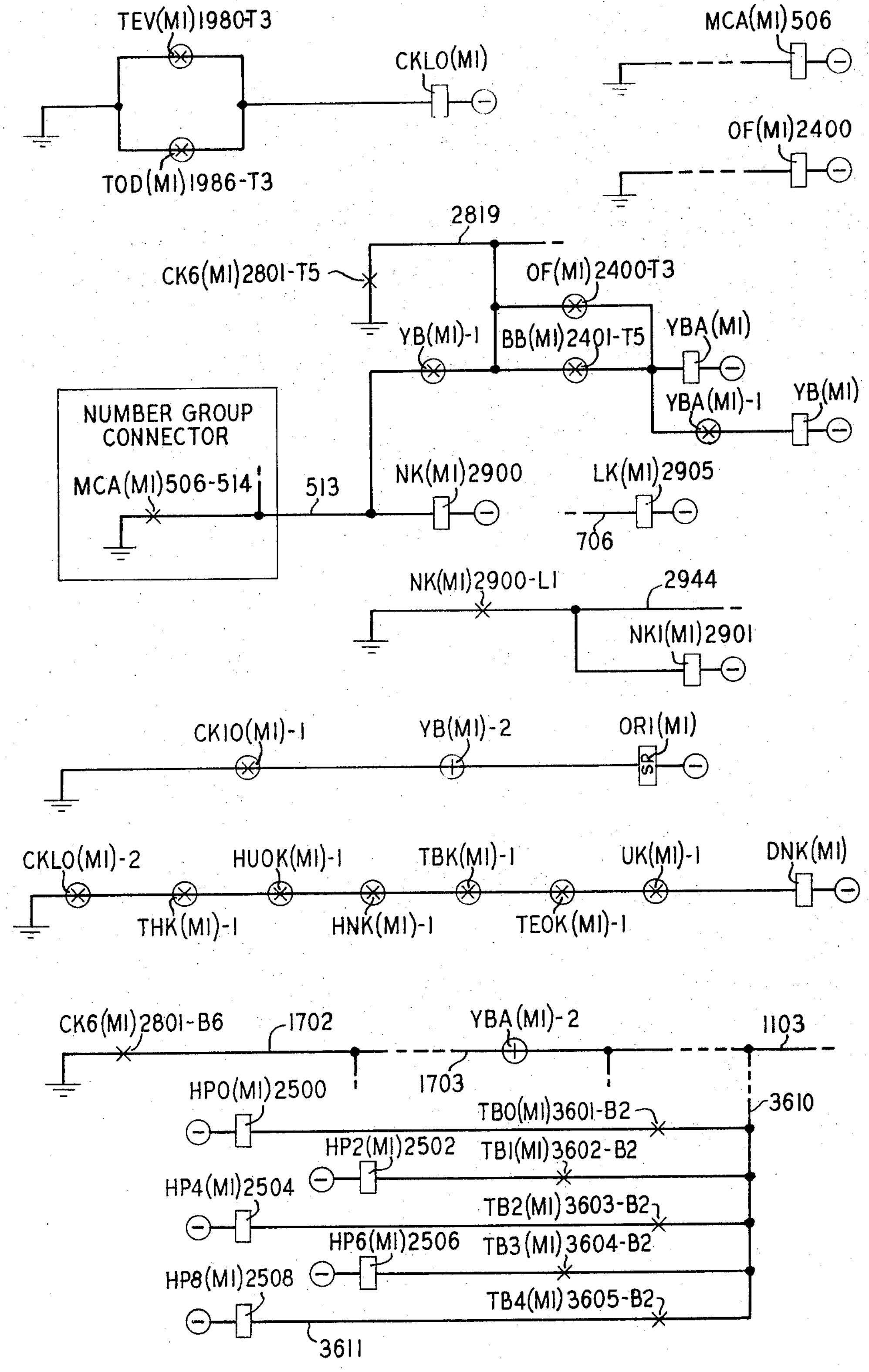

After the called number has been registered in the terminating sender 244 of FIG. 2, the sender 244 initiates circuit operations to seize and connect to an idle terminating marker. It will be assumed that marker M1, of the ten markers M0 to M9, will be used. Connector relay S(S1)3204 of FIG. 2 is individual to sender 244 and is operated over an obvious circuit, the details of which are disclosed in Dehn et al., but omitted from FIG. 2. In FIG. 3, the operation of connector S(S1)3204 causes the operation of relays CK6(M1)2801, CK7(M1)2802 and CK10(M1) in a circuit extending from ground, through make contact S(S1)3204–R3, through some circuitry not shown in FIG. 3, thence over conductor 3250 and to battery in parallel through the windings of relays CK6(M1)2801, CK7(M1)2802, and CK10(M1). In FIG. 4, relay CK10(M1), in operating, causes the operation of relay OR1(M1) in a circuit extending from ground, through make contact CK10(M1)–1 and break contact YB(M-1)–2 to battery through the winding of relay OR1(M1). In FIG. 3, the operation of relay CK6(M1)2801 completes three circuits for causing the operation of the three relays CK1(M1)2804, CK2(M1)2807, and CK3(M1)2809: relay CK1(M1)2804 operates in a circuit extending from ground in FIG. 3, through make contact CK6(M1)2801–T3, through the break contact of the transfer pair CK4(M1)2803–T2, to lead 2805 and to battery through the winding of relay CK1(M1)2804; relay CK2(M1)2807 operates in a similar circuit under the control of make contact CK6(M1)2801–T2 and the brake contact of transfer pair CK5(M1)2806–T1; and, relay CK3(M1)2809 operates in a similar circuit under the control of make contact CK6(M1)2801–T1 and the break contact of transfer pair CK5(M1)2806–B1.

As part of the sender-to-marker connection, the connector relay TM(M1)3206 of FIG. 2 is also operated, as described in Dehn et al. As shown in FIG. 2, the operation of the two connectors S(S1)3204 and TM(M1)3206 complete connection of a large number of leads between the terminating sender 244 and marker M1. The actual transfer of data to marker M1 will be described later.

MARKER BUSY

Figure 5:
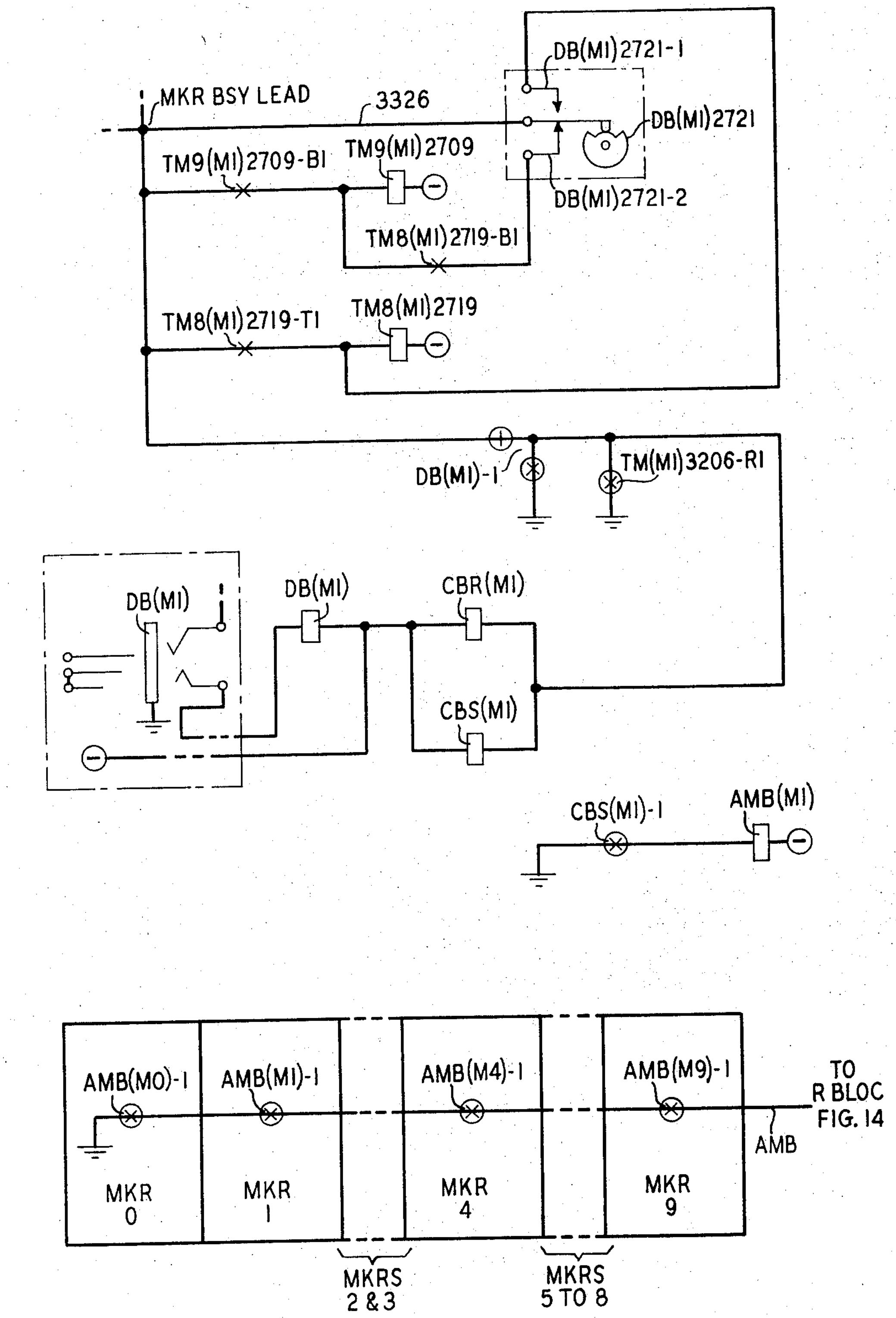

In FIG. 5, upon the operation (FIG. 2) of connector TM(M1)3206, circuits are completed for providing a marker busy indication and for starting an overall marker work timing interval.

A circuit is completed in FIG. 5 from ground, over make contact TM(M1)3206–R1, thence in parallel through the windings of relays CBR(M1) and CBS(M1), and to battery over a circuit not shown in detail. Relays CBR(M1) and CBS(M1) operate in the latter circuit, the operation of relay CBS(M1) causing the operation in FIG. 5 of marker-busy relay AMB(M1) in an obvious circuit under the control of make contact CBS(M1)-1.

Make contact TM(M1)3206-R1 also applies ground to the marker busy lead 3326 in FIG. 5 to activate the timer comprising relays TM9(M1)2709 and TM8(M1)2719 under control of the interrupter DB(M1)2721. When the upper contact DB(M1)2721-1 of interrupter DB(M1)2721 closes, relay TM8(M1)2719 operates in a circuit extending from ground on lead 3326, over contact DB(M1)2721-1, to battery through the winding of relay TM8(M1)2719. The operated relay TM8(M1)2719 locks over its own make contact TM8(M1)2719-T1 to ground on lead 3326. Approximately 28 seconds after the interrupter DM(M1)2721 closes its upper contact DM(M1)2721-1, the movable contact will open the upper contact DB(M1)2721-1 and will close the lower contact DB(M1)2721-2. Closure of contact DM(M1)2721-2 extends ground on lead 3326 through make contact TM8(M1)2719-B1 to battery through the winding of relay TM9(M1)2709. If relay TM9(M1)2709 becomes operated, it will lock through its make contact TM9(M1)2709-B1 to ground on lead 3326 (if the marker is still busy so that lead 3326 is still grounded). If relay TM9(M1)2709 operates, an alarm will be given since the marker should have finished all of its switching functions and should have released to normal (lead 3326 no longer grounded) before the lapse of the 28 seconds. It will be assumed that marker M1 does finish its functions within that allotted maximum time so that lead 3326 becomes ungrounded to release relay TM8(M1)2719 before relay TM9(M1)2709 can be operated.

In FIG. 5, marker M1 may be made busy by the insertion of the shorted plug into the DB(M1)jack. This would cause the operation of relay DB(M1) in an obvious circuit. Relay DB(M1), in operating, opens the break contact of its transfer pair DB(M1)-1 to prevent activation of the above-described 28 second timer. Also, the closing of the make contact of the transfer pair DM(M1)-1 operates relays CBR(M1) and CBS(M1) just as above-described upon the operation of the connector TM(M1)3206. Under these circumstances, marker M1 will be rendered busy just as though it were involved in operational switching functions. It will be assumed, however, that marker M1 is rendered busy in the normal manner by the operation of connector TM(M1)3206, as above described.

NUMBER TRANSFER VALIDITY CHECK

As fully described in Dehn et al, before the called number and incoming circuit frame locations are considered properly transferred to and registered in the marker, a check is made to verify that all registering leads are in satisfactory condition and that all register relays are operable. This check is performed as an incident to the operation in FIG. 3 of the checking relays CK1(M1)2804, CK2(M1)2807, and CK3(M1)2809.

The net result of satisfactory completion of the register-validity checking operation, the details of which are not essential to an understanding of the present disclosure, is the operation in FIG. 3 of the check relays CK4(M1)2803 and CK5(M1)2806. If the validity check is satisfactory, as will be assumed, a circuit is extended from ground in FIG. 3, through make contacts CK1(M1)2804-T1, CK2(M1)2807-B1, and CK3(M1)2809-T2, over lead 3702, to battery through the left windings of relays CK4(M1)2803 and CK5(M1)2806. The dotted parts of the latter circuit indicate the undisclosed details of the check circuit whereby the validity and integrity of the registration circuitry is verified. When relays CK4(M1)2803 and CK5(M1)2806 operate in the above validity check circuit, the following circuit functions follow:

1. relays CK4(M1)2803 and CK5(M1)2806 lock operated under the control of the operated relay CK6(M1)2801;
2. relays CK1(M1)2804, CK2(M1)2807, and CK3(M1)2809 release;
3. and, only those marker register relays remain operated according to the grounded leads from sender 244 as determined by the called number and the incoming circuit location.

Relays CK4(M1)2803 and CK5(M1)2806 lock in circuits extending from battery, through their right windings, and thence in parallel to ground over three circuits: one circuit extends over the make contact of the transfer pair CK4(M1)3802-T2 to ground over make contact CK6(M1)2801-T3; a second circuit extends over the make contact of the transfer pair CK5(M1)2806-T1 to ground over make contact CK6(M1)2801-T2; and, the third circuit extends over the make contact of the transfer pair CK5(M1)2806-B1 to ground over make contact CK6(M1)2801-T1.

Relays CK1(M1)2804, CK2(M1)2807, and CK3(M1)2809 are released by the opening of the break contacts of the respective transfer pairs CK4(M1)2803-T2, CK5(M1)2806-T1, and CK5(M1)2806-B1, thereby opening the original operating circuit for the locked relays CK4(M1)2803 and CK5(M1)2806.

As a result of the above validity check relay operations and releases, the called number and the incoming circuit location are registered in the marker M1 as described in the following section.

SENDER TO MARKER NUMBER REGISTRATION

The called number and incoming circuit frame location, etc., are registered in register and control relays of marker M1 in various places shown in FIGS. 2, 4, 6 and 7. It will be assumed that the four numerals (thousands, hundreds, tens and units digits) of the called number are 2489 and that the frame upon which the incoming trunk is located is frame 4.

In FIG. 2, the incoming trunk location on frame 4 is registered in marker M1 by the operation of relay F4(M1)2913 by ground on lead 3241 out of cables 2943 and SMC from sender 244 over make contact of connectors S(S1)3204 and TM(M1)3206. Likewise, the thousands digit 2 is registered by the operation of relay TH2(M1)3504; the hundreds digit 4 is registered by the operation of relay H4(M1)3513; the tens digit 8 is registered by the operations of relays T1(M1)3401, T2(M1)3402, and T5(M1)3404; and the units digit 9 is registered by the operations of relays U4(M1)3413 and U5(M1)3414. The coding of these register relay operations is such that the digit registered is the sum of the relay numerals (1, 2, 4, 5) of the operated relays (all relays being released represent the digit 0). For instance, the F4(M1)2913 relay being operated alone designates the digit 4; also, relays TH2(M1)3504 and H4(M1)3513 being operated alone designate the respective digits 2 and 4; relays T1(M1)3401, T2(M1)3402, and T5(M1)3404 being operated together designate the digit 8 (1 plus 2 plus 5); and, relays U4(M1)3413 and U5(M1)3414 being operated together designate the digit 9 (4 plus 5). It will be noted in such a coding arrangement, which uses relays with numbers 1, 2, 4 and 5, that the relay with the designation 5 is unoperated for digits 0, 1, 2, 3 and 4 and is operated for digits 5, 6, 7, 8 and 9.

In the upper part of FIG. 6 are indicated 20 so-called five-hundreds-block relays FH0(M1) through FH9(M1) and FH0'(M1) through FH9'(M1). Ten thousand line numbers in an office, 0000 to 9999, are divided into 20 groups of 500 consecutive numbers, each such group being represented by one of the 20 five-hundreds-block relays as follows:

| Thousands Digit | Block of Numbers | 500 Block Relay |
|---|---|---|
| 1 | 0000 to 0499 | FH0 |
| 0 | 0500 to 0999 | FH0' |
| 1 | 1000 to 1499 | FH1 |
| 1 | 1500 to 1999 | FH1' |
| 2 | 2000 to 2499 | FH2 |
| 2 | 2500 to 2999 | FH2' |
| 3 | 3000 to 3499 | FH3 |
| 3 | 3500 to 3999 | FH3' |
| 4 | 4000 to 4499 | FH4 |
| 4 | 4500 to 4999 | FH4' |
| 5 | 5000 to 5499 | FH5 |
| 5 | 5500 to 5999 | FH5' |
| 6 | 6000 to 6499 | FH6 |
| 6 | 6500 to 6999 | FH6' |
| 7 | 7000 to 7499 | FH7 |
| 7 | 7500 to 7999 | FH7' |
| 8 | 8000 to 8499 | FH8 |
| 8 | 8500 to 8999 | FH8' |
| 9 | 9000 to 9499 | FH9 |
| 9 | 9500 to 9999 | FH9' |

Since the assumed thousands digit is 2, as indicated by the operation in FIG. 2 of relay TH2(M1)3504, and since the assumed hundreds digit is 4, as indicated by the operation in FIG. 2 of relay H4(M1)3513, relay FH2(M1)3000 in FIG. 6 will be operated as the indicated five-hundreds-block relay. Relay FH2(M1)3000 will be operated from ground on lead 3540 under the control of the indicated operations of relays TH2(M1)3504 and H4(M1)3513 in the respective thousands and hundreds digit registers. Also in FIG. 6 relay H6(M1) will be released since relay H5(M1)3514 of FIG. 2 is released.

Also in FIG. 6, units auxiliary relays U4'(M1) and U5'(M1) and hundreds number relay HN4(M1)3014 will be operated. The operating circuits for relays U4'(M1) and U5'(M1) extend from ground, over make contact CK5(M1)2806–B4 and break contact CK2(M1)3807–B2 to lead 2814, thence over respective make contacts U4(M1)3413–T3 and U5(M1)34-14–T3 to the windings of relays U4'(M1) and U5'(M1). The ground on lead 2814 extends over contacts of the hundreds digit relays-particularly the operated relay H4(M1)3513- and lead 3541 to battery through the winding of relay HN4(M1)3014. As mentioned earlier, if the hundreds digit is 0, 1, 2, 3 or 4 or is 5, 6, 7, 8 or 9, the hundreds number will be respectively 0, 1, 2, 3 or 4.

Figure 7:
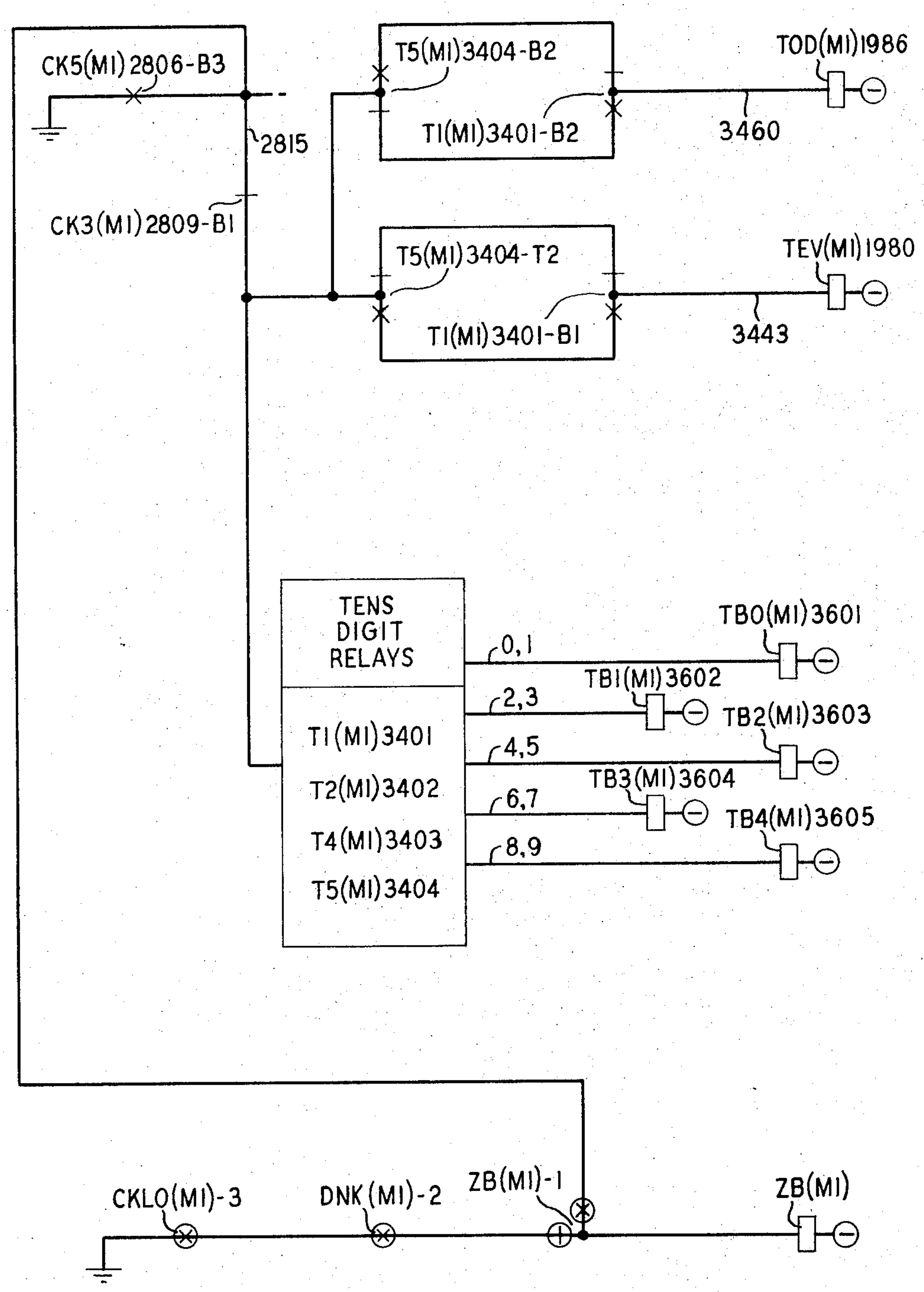

In FIG. 7, since tens digit relays T1(M1)3401 and T5(M1)3404 are both operated, the tens-even relay TEV(M1)1980 will be operated with the tens-odd relay TOD(1986) remaining released. Ground extends over make contact CK5(M1)2806-B3 to lead 2815, thence over break contact CK3(M1)2809–B1, and over the make contacts of the transfer pairs T5(M1)3404–T2 and T1(M1)3401–B1 to lead 3443, thence to battery through the winding of relay TEV(M1)1980.

Also in FIG. 7, one of five, tens block relays will be operated depending upon which one of the five pairs of tens digits is involved as indicated by the designations 0,1 and 2,3 and 4,5 and 6,7 and 8,9 on the leads to the tens block relays. Since the tens digit is 8-relays T1(M1)3401, T2(M1)3402 and T5(M1)3404 operated — the tens block relay TB4(M1)3605 will be operated from the ground on lead 2815 over break contact CK3(M1)3809–B1.

In FIG. 4, with at least one of the relays TEV(M1)1980 and TOD(M1)1986 operated, relay CKL0(M1) is operated in an obvious circuit, over make contact TEV(M1)1980–T3 in the assumed situation. Also, with tens blcok relay TB4(M1)3605 operated in FIG. 7, a circuit is completed at the bottom of FIG. 4 for operating relay HP8(M1)3508, HP8(M1)2508, circuit extending from ground in FIG. 4, over make contact CK6(M1)2801–B6 to lead 1702, thence to lead 1703 via some circuitry not shown, thence over break contact YBA(M1)–2, over some circuitry not shown to leads 1103 and 3610, thence over make contact TB4(M1)3605–B2 to lead 3611, and to battery through the winding of relay HP8(M1)2508.

With the marker register and control relays operated during the register mode of the marker as previously described, the marker is prepared to seize the proper number group circuit for a translation of the called number numerals 2489, as will be described in the following section. That is, the marker advances from its register mode of operation to its test start mode of operation.

NUMBER GROUP SEIZURE

With the check relays of FIG. 3 in their present condition — CK4(M1)2803 and CK6(M2)2806 operated and CK1(M1)2804, CK2(M1)2807 and CK3(M1)2809 released — the marker proceeds to determine the location, class and condition of the wanted line as identified by the called number 2489 registered in various ways in the marker. The marker M1 identifies the desired number group circuit (in which the wanted line is located) by means of the operated five-hundreds-block relay FH2(M1)3000 of FIG. 6 and the operated hundreds-number relay HN4(M1)3014 of FIG. 6. The details of such action of marker M1 in seizing the proper number group circuit are described in Dehn et al.; and, the end result is the operation in FIG. 4 of the multicontact connector relay MCA(M1)506, thus completing the connections between marker M1 and the number group circuit for performing a number of circuit functions during a test mode of marker operation.

In FIG. 4, the operation of connector MCA(M1)506 extends ground over its make contact MCA(M1)5-06–514 to lead 513 to cause the operation of relay NK(M1)2900 as an indication to marker M1 that the number group circuit has been seized for a marker test mode. The operated relay NK(M1)2900 completes a circuit in FIG. 4 from ground, over its make contact NK(M1)2900–L1 to lead 2944 and to battery through the winding of relay NK1(M1)2901, which relay thereupon operates. The operation of relays NK(M1)2900 and NK1(M1)2901 furnish off-normal grounds for a number of marker circuit control functions.

It will be noted in FIG. 3 that the operation (FIG. 4) of relay NK1(M1)2901 opens its break contact NK1(M1)2901-R4. This prevents marker M1 from connecting to the overload control of FIG. 17 (as will be described later) since marker M1 has already seized a number group circuit and thus has entered its test mode of operation.

CALLED LINE IDLE

After the number group circuit has provided marker M1 with the line location and class of the wanted line, as described in Dehn et al., the number group proceeds to inform marker M1 with respect to the busy-idle condition of the wanted line.

Figure 8:
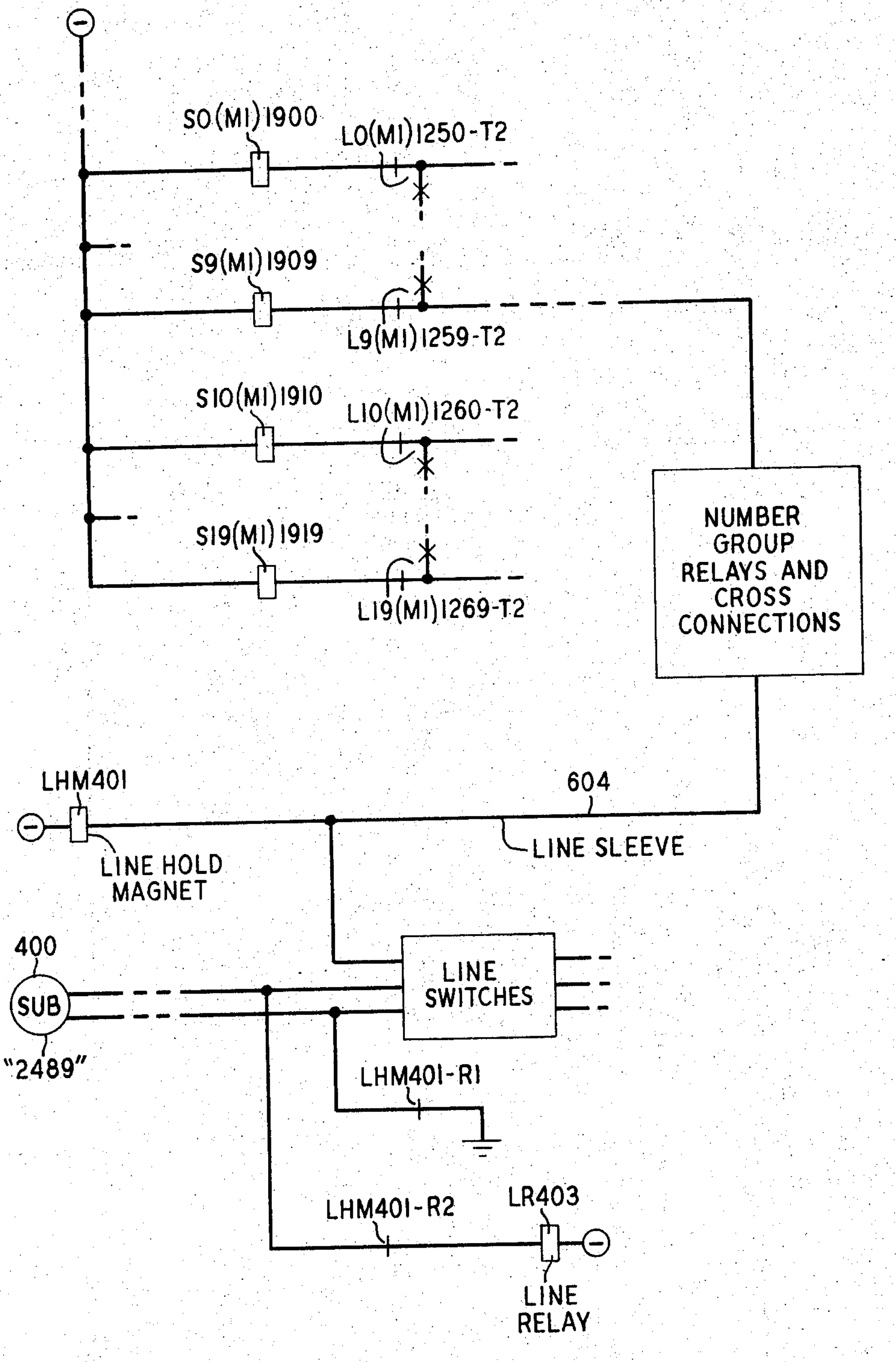

In FIG. 8, a circuit is completed for testing the sleeve leads of a group of 20 lines at a time by the use of the 20 sleeve relays SO(M1)1900 through S19(M1)1919. It will be assumed that relay S9(M1)1909 is the sleeve relay associated during the sleeve test with the wanted line, the hold magnet for which is hold magnet LHM 401 in FIG. 8. A circuit extends from battery in FIG. 8, through the winding of relay S9(M1)1909 and over the break contact of transfer pair L9(M1)1259-T2, thence over cross-connections in the number group circuit to the sleeve lead 604 of the wanted line of subscriber 400, whose called numericals are 2489. If the called line is busy, the hold magnet LHM 401 will be in an operated condition under control of a grounded sleeve lead 604. If the called line is idle, the hold magnet LHM 401 will be released and the sleeve lead 604 will not be grounded.

Figure 9:
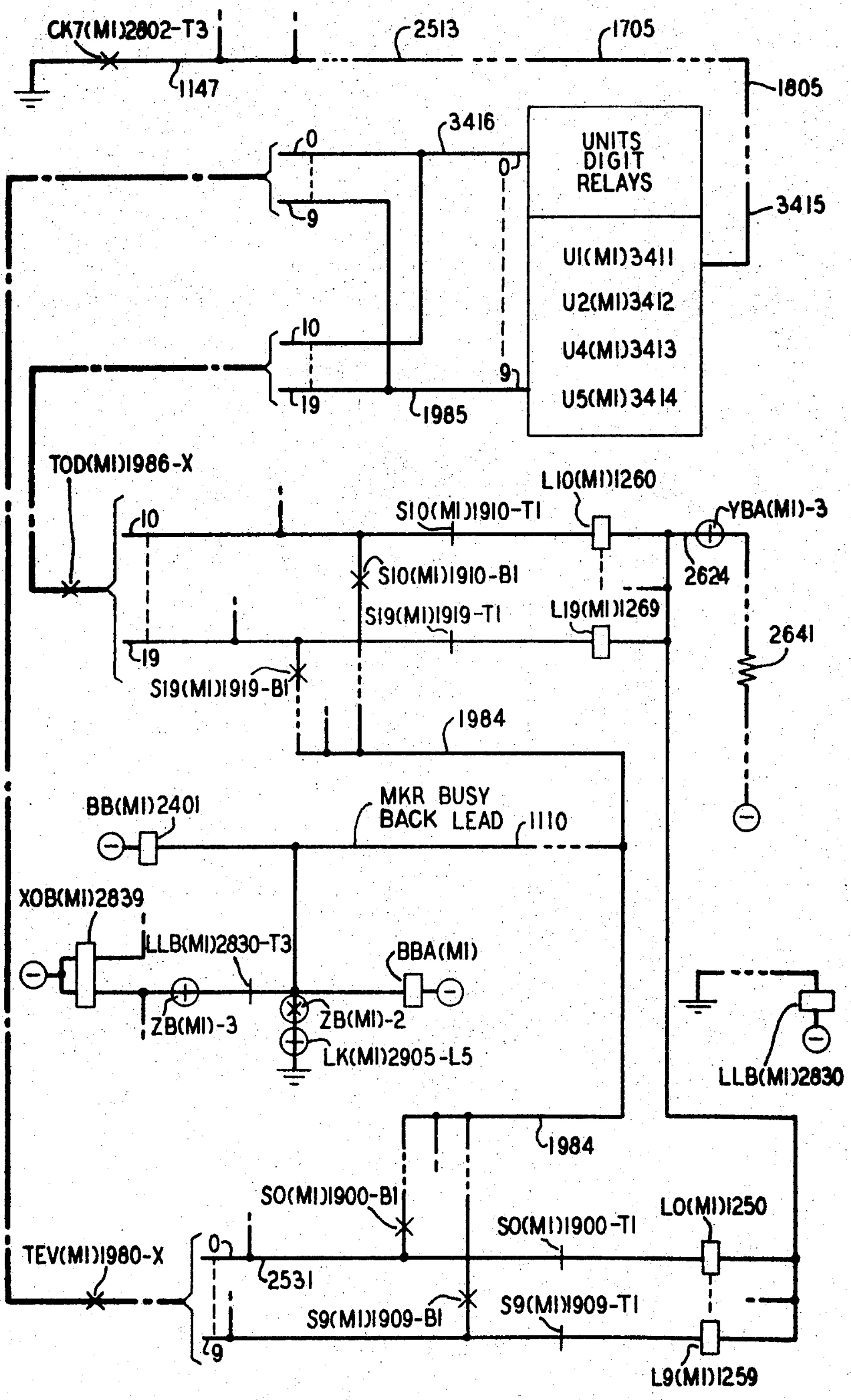

If it be assumed that the called line is idle, relay S9(M1)1909 in FIG. 8 will remain released. This will allow the marker to enter upon its line selection mode of operation to initiate selection of that called line by the use of circuit outlined in FIG. 9. In FIG. 9, ground extends over make contact CK7(M1)2802-T3 to lead 1147, thence over leads 2513, 1705, 1805 and 3415 to the units digit register relays, thence over the "9" lead 1985 to make contacts of relays TOD(M1)1986 and TEV(M1)1980. Since relay TEV(M1)1980 of FIG. 7 is operated—with relay TOD(M1)1986 released—the grounded lead 9 extends over a make contact, one of the group designated TEV(M1)1980-X, of the operated realy TEV(M1)1980 to lead 9, thence over break contact S9(M1)1909-T1 of the released sleeve relay S9(M1)1909 of FIG. 8, through the winding of line relay L9(M1)1259, over lead 2624, through break contact YBA(M1)-3, and through resistance 2641 to battery. Line relay L9(M1)1259 operates in the latter circuit to allow marker M1 to proceed with channel testing, etc., preparatory to completing a connection from the incoming trunk to the called line through the incoming and line switches (see FIG. 1). Relay LK(M1)2905 in FIG. 4 is operated during idle line selection as a check to marker M1 that the line choice circuit has been connected.

If marker M1 succeeds in finding and connecting up a channel through the crossbar switches from the incoming trunk to the called line, ringing of the called line is initiated and the marker, sender, and number group circuits release, laving the connection under the supervision of the trunk circuits involved in the connection.

If the marker M1 should encounter an all-channels-busy condition, relay OF(M1)2400 of FIG. 4 will be operated to direct marker M1 to set up an overflow tone on the incoming trunk and to release itself, the sender, and the number group circuit. When relay OF(M1)2400 operates under such an all-channels-busy condition, circuits are completed in FIG. 4 for operating relays YBA(M1) and YB(M1). Relay YBA(M1) operates in a circuit extending from ground, over make contact CK6(M1)2801-T5, lead 2819, make contact OF(M1)2400-T3, to battery through the winding of relay YBA(M1). The operation of relay YBA(M1) extends its operating ground over its make contact YBA(M1)-1 to cause the operation of relay YB(M1). Also, make contact YB(M1)-1 extends ground on lead 2819 to the winding of relay NK(M1)2900 to hold the latter relay operated independent of the number group connector make contact MCA(M1)506-514.

The operations of relays YBA(M1) and YB(M1), as above described, exercise a number of control functions in the marker M1 including the following ones. In FIG. 4, the opening of break contact YB(M1)-2 allows slow-release relay OR1(M1) to start to release, the release of relay OR1(M1) occurring in something in the order of about 100 ms (milliseconds). In the bottom of FIG. 4, the opening of break contact YBA(M1)-2 opens the operating circuit for the relays HPO(M1)2500 to HP8(M1)2508, which relays are normally used to start the busy testing of a called line. In FIG. 9, the opening of break contact YBA(M1)-3 opens the operating circuit for the line selection relays L0(M1)1250 through L19(M1)1269, thus to prevent an attempt to select a line.

Other details of idle line selections, etc., are described in Dehn et al. and are not significant to present discussions.

CALLED LINE BUSY

As above mentioned with regard to FIG. 8, if the called line is found to be busy, the sleeve relay S9(M1)1909 will operate from the ground on sleeve lead 604 of the wanted line. If relay S9(M1)1909 is operated under these circumstances, the line selection circuitry of FIG. 9 will be arranged so that the line selection relay L9(M1)1259 does not operate and so that the busy-back relay BB(M1)2401 operates instead. The operating circuit for relay BB(M1)2401 extends from ground in FIG. 9 on lead 9 (at the bottom of FIG. 9), thence over make contact S9(M1)1909-B1 to lead 1984, thence to the marker busy-back lead 1110 and to battery through the winding of relay BB(M1)2401. Relay LLB(M1)2830 in FIG. 9 will be operated on a number group line test so that the circuit to relay XOB(M1)2839 is open at break contact LLB(M1)2830-T3. Relay XOB(M1)2839 is otherwise connected through break contacts ZB(M1)-3 and LLB(M1)2830-T3 to the marker busy-back lead 1110 to test for false grounds on lead 1110. Relay BBA(M1) in FIG. 9 operates in parallel with relay BB(M1)2401. Also, it is to be noted that relay LK(M1)2905 in FIG. 4 remains released during a busy-back switching function; so, break contact LK(M1)2905-L5 in FIG. 9 remains closed during the ensuing busy-back switching function initiated by the operation in FIG. 9 of relay BB(M1)2401.

The operation in FIG. 9 of relay BB(M1)2401, by virtue of its make contact BB(M1)2401-T5 in FIG. 4, will cause the operation of relays YBA(M1) and YB(M1) and will cause the locking of the operated relay NK(M1)2900 just as in the previously described case where relay OF(M1)2400 of FIG. 4 was operated on an all-channels-busy condition.

Also in FIG. 4, the operation of relay YB(M1) will open its break contact YB(M1)–2 in the operating circuit of relay OR1(M1), thus allowing the slow-release relay OR1(M1) to start to release. There will be a lapse of about 100 ms from the time that relays BB(M1)2401 and BBA(M1) of FIG. 9 are operated until the time that relay OR1(M1) of FIG. 4 releases. During this interval of time, marker M1 will finish its functions with the overload control circuitry, as will be described.

As is well known, and as described in Dehn et al., whenever the busy-back relay BB(M1)2401 of FIG. 9 is operated, the so-called busy-back switching function or mode of operation is initiated by marker M1. Such busy-back switching function results in busy tone being transmitted rearward (toward the calling end of the connection) and results in the release of the marker, the sender, and the number group circuit.

Marker M1, prior to its release subsequent to having performed its busy-back switching function, will have about 100 ms within which to connect with the overload control circuitry, if necessary, and to finish its functions therewith, as to be described presently.

ALL MARKERS BUSY

As mentioned earlier, one of the conditions imposed by the exemplary embodiment as a prerequisite for initiating action within the overload control circuit is that all markers must be busy. In FIG. 5, relay AMB(M1) is operated since marker M1 is busy with the instant call. It will be assumed that at the moment each of the other markers MO and M2 through M9 is also busy so that their corresponding marker busy relays (not shown) AMB(MO) and AMB(M2) through AMB(M9) are all operated. At the bottom of FIG. 5 is shown a chain circuit including make contacts of all of the marker busy relays, so ground extends over make contacts of all of these relays to provide ground on lead AMB into FIG. 14. Only make contacts AMB(M0)–1, AMB(M1)–1, AMB(M4)–1 and AMB(M9)–1 are shown; but, it is obvious that the chain circuit includes a make contact of each of the ten marker busy relays.

It will be assumed (details to be described later) that the random busy line overload control circuitry of FIGS. 14 through 23 is in a normally released state. None of the relays or connectors thereof are operated; and, the time delay circuits TD1 and TD2 of FIG. 14 have been recycled to normal.

OVERLOAD CONTROL INITIAL TIMING

In FIG. 14, with the overload control circuitry of FIGS. 14 through 23 normally released, and before relay AMB of FIG. 14 is operated by marker M1, as will be described, the timers TD1 and TD2 are in their quiescent states.

Figure 15:
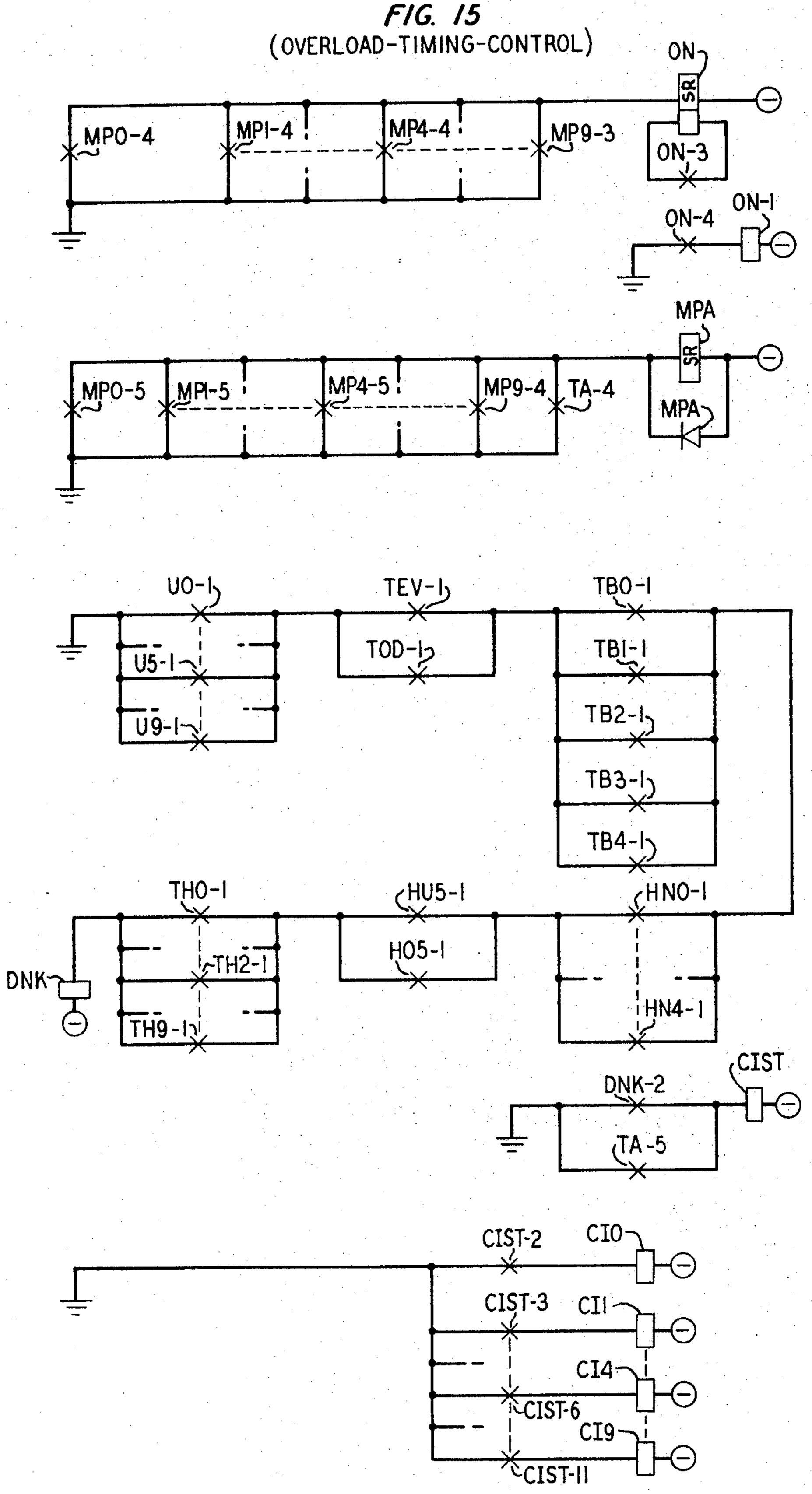

The normal quiescent state of timer TD1 finds its terminal 11 grounded over break contact AMB–1 of the released AMB relay of FIG. 14 and its terminal 10 extending over a break contact of the released TST KEY transfer pair TST KEY–1, over break contact ON–1 of the released ON relay of FIG. 15, over the break contact of the transfer pair AMBA–1 of the released AMBA relay of FIG. 14, to ground through the winding of relay AMBA. Under these circumstances, transistor T1 is fully on, transistor T2 is cut off, and relay AMBA is released since the collector of transistor T2 is essentially at ground potential (terminal 10). The timing interval is started by the removal of ground from terminal 11, such as by the opening of break contact AMB–1 upon the operation in FIG. 14 of relay AMB. This causes the charge in the timing capacitor C1 to discharge through transistor T1 until the discharge current through transistor T1 is significantly decreased by the shunting action of diode D1, whereupon the transistor T1 cuts off to allow transistor T2 to turn fully on to operate relay AMBA. The time constant of the timing capacitor C1 discharge circuit is arranged so that some desired time from 2 to 6 seconds expires from the time that terminal 11 of timer TD1 is ungrounded to the time that relay AMBA operates.

The timer TD2 of FIG. 14 is arranged like timer TD1 except that the timing interval from the ungrounding of terminal 11 to the operation of relay TA is about 100 ms. In timer TD2, terminal 11 may be grounded by the break contact ON–2 of a released relay ON of FIG. 15, by the make contact DNK–1 of an operated DNK relay of FIG. 15, or by the chain of break contacts MPO–1 through MP9–1 of unoperated relays MPO to MP9 of FIG. 14.

At any time, during a timing interval, that terminal 11 of timer TD1 or timer TD2 becomes regrounded, the timer is recycled with transistor T1 fully on, transistor T2 fully off, and the timer controlled relay AMBA of TA of FIG. 14 released, unless the latter relay has been operated and locked independently of the timer.

With respect to timer TD1 (and the same applies to timer TD2), during the quiescent state (terminal 11 grounded), the following specific circuit conditions prevail:

1. terminal 11 is at ground potential (zero volts);
2. terminal 4 is at approximately minus 48 volts;
3. transistor T1 is fully on;
4. transistor T2 is fully cut off;
5. and a low impedance charging path for capacitor C1 extends from ground at terminal 11, through capacitor C1, and to negative battery through diode D1 and resistor R2.

Immediately after removal of ground from terminal 11 (start of timing interval), terminal 11 assumes a potential of about minus 48 volts, thus driving terminal 4 to about minus 96 volts. Diode D1 becomes reverse biased and capacitor C1 starts to discharge in a circuit from ground, through resistor R1, capacitor C1, resistor R3, the base-emitter circuit of transistor T1, and to negative battery. This causes terminal 4 to start from about minus 96 volts and to drop gradually toward minus 48 volts. When the voltage on terminal 4 reaches a value slightly more positive than negative battery (minus 48 volts), diode D1 will again become forward biased to allow most of the discharge current from capacitor to bleed off through the low impedance represented by diode D1 and resistor R2, thus to rapidly shunt discharge current from the base-emitter circuit of transistor T1 to cause transistor T1 to cut off. When transistor T1 cuts off transistor T2 is turned off. A substantial current will then flow through the emitter-to-base-to-collector of transistor T2 and to ground through the controlled relay AMBA to operate that relay. Regrounding of terminal 11 turns on transistor T1, which turns off transistor T2 to return the circuit to its quiescent state, capacitor C1 quickly returning to its initial condition under control of the low impedance circuit of diode D1 and resistor R2.

Timer TD2 of FIG. 14 will be referred to later when it comes into play; it has been included in this section as to details because of its similarity to timer TD1 as to internal functioning.

MARKER SEIZES OVERLOAD CONTROL

Assuming, as previously mentioned, that an all-markers-busy condition prevails at the time that marker M1 becomes busy, as indicated by the operation of FIG. 5 of the marker busy relay AMB(M1) for marker M1, a circuit will be completed for operating the all-markers-busy relay AMB in the overload control circuit of FIG. 14. The circuit extends from ground in FIG. 5, through the chain of make contacts AMB-(MO)-1, AMB(M1)-1, etc., AMB(M4)-1, etc., AMB(M9)-1, lead AMB into FIG. 14, then through break contact MB JACK-1 of the make-busy jack MB JACK (assumed to be normal), and over break contact TA-1 (relay TA of FIG. 14 assumed to be released) to battery through the winding of relay AMB.

In response to an all-markers-busy condition, as indicated by the operation in FIG. 14 of overload control relay AMB, the 2 to 6 second timer TD1 of FIG. 14 is started by the opening of break contact AMB-1 to unground terminal 11 of timer TD1. If any of the markers M0 to M9 becomes idle, its busy relay, such as AMB(M1) for marker M1 in FIG. 5, will release to in turn release the all-markers-busy relay AMB in FIG. 14. The release of relay AMB in FIG. 14, before timer TD1 can time-out, will close break contact AMB-1 to reground terminal 11 of timer TD1 to recycle timer TD1 to normal without allowing the operation of relay AMBA in FIG. 14.

It will be assumed that the all-markers-busy condition prevails long enough for timer TD1 to time-out. When timer TD1 times-out, relay AMBA will operate in a circuit extending from ground, through the winding of relay AMBA, over the break contact of the transfer pair AMBA-1, over break contact ON-1 of relay ON (FIG. 15), thence over the break contact of the transfer pair TST KEY-1 and through the fully on transistor T2. Relay AMBA, in operating, locks over the make contact of its transfer pair AMBA-1 to battery over break contacts CIST-1 and TA-2.

With relay AMBA of FIG. 14 operated, both of the starting conditions are satisfied for enabling a marker to seize the overload control circuit to register a busy called number. As will be recalled, the two starting conditions are (1) an all-markers-busy condition (2) lasting for the prescribed time (from 2 to 6 seconds) duration for which timer TD1 is set in FIG. 14.

In the bottom part of FIG. 14 is shown the preference-lockout circuitry by means of which markers M0 to M9 compete, when necessary, for seizure of the overload control circuitry. It is a well-known arrangement whereby attempts at simultaneous seizure by a plurality of markers will result in a preferred marker succeeding and in the other markers being excluded for the time being. In the arrangement shown, the order of preference is from M9 to M0. It will be assumed that marker M1 seizes control so that the other markers are locked-out.

It will be recalled that the busy-back relay BBA(M1) of marker M1 in FIG. 9 was operated to place marker M1 in its busy-back mode as a result of finding the called line busy. Also, in FIG. 4, relay OR1(M1) of marker M1 started to release upon the operation in FIG. 4 of relay YB(M1) but will not release until the lapse of its 100 ms release time measured from the time that relay BB(M1)2401 was operated. Under such circumstances, a circuit is completed for operating the preference relay MP1 for marker M1 in FIG. 14, the circuit extending from battery in FIG. 3, through resistor MPB(M1), over make contacts BBA(M1)-1 and OR1(M1)-1, and over break contact DNK(M1)-1 to the lead MP1 from marker M1 to the overload control of FIG. 14. In FIG. 14, the resistance battery on lead MP1, from marker M1 in FIG. 3, extends over make contact AMBA-3, break contact CI1-1, through the winding of relay MP1, thence over the chain of break contacts including the break contacts of transfer pairs MP2-3 (not shown) and MP4-3, etc., break contact MP9-2, and break contacts MP8-2, MP4-2, MP1-2 and MP0-3, etc., to ground. Relay MP1 in FIG. 14 operates in the latter circuit, locks through the make contact of its transfer pair MP1-3 and break contact MPO-3 to ground, and opens at its break contact MP1-2 and the break contact of its transfer pair MP1-3 the operating circuits of all other relays MP0 and MP2 to MP9.

Figure 16:
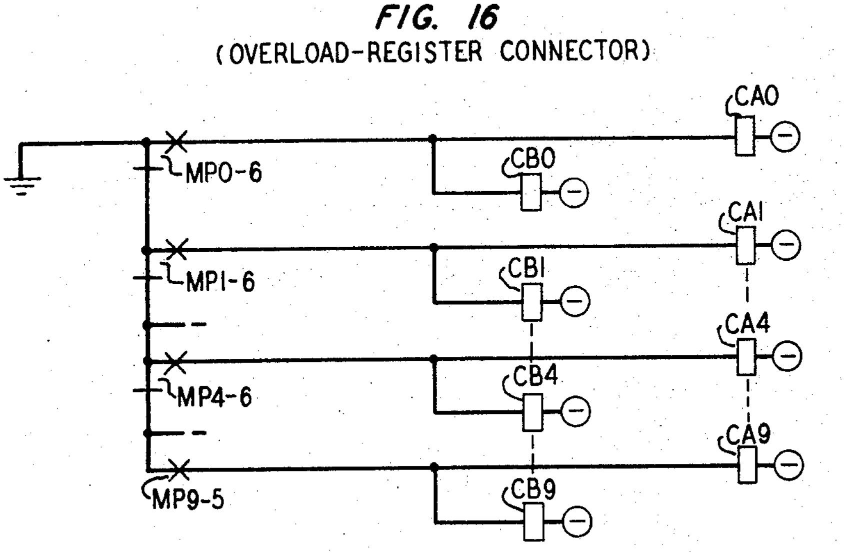

The operation in FIG. 14 of preference relay MP1 for marker M1 performs the following functions to prepare the overload circuit for receiving the digits of the busy called line:

1. in FIG. 14, the operated relay MP1 opens its break contact MP1-1, this to open one grounding circuit to terminal 11 of timer TD2;
2. in FIG. 15, the overload control off-normal relay ON is operated in an obvious circuit through its upper winding and over make contact MP1-4;
3. in FIG. 15, relay MPA operates in an obvious circuit over made contact MP1-5;
4. and, in FIG. 16, register connectors CA1 and CB1 operate (for a purpose to be described) in a circuit from ground, over the break contact of the transfer pair MP0-6, over the make contact of transfer pair MP1-6, and to battery through their windings.

Relay ON of FIG. 15, in operating, closes a short circuit around its lower winding through make contacts ON-3 to render itself slow-releasing (about 200 ms release time) for a purpose to be described later. Off-normal relay ON1 of FIG. 15 is operated in an obvious circuit over make contact ON-4. Relay ON1, in operating, provides locking grounds for the registers of FIGS. 18 through 23.

Figure 17:
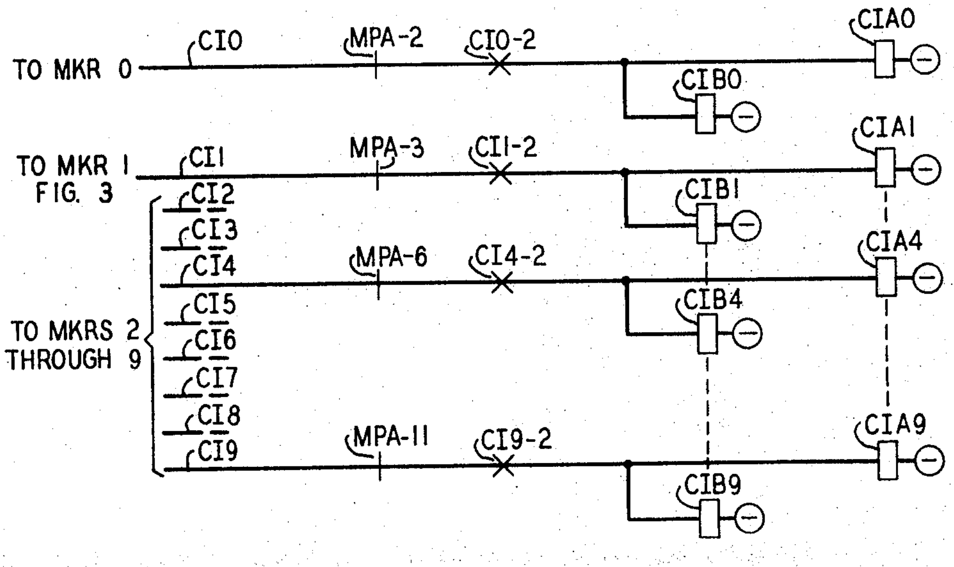

Upon the operation of relay MPA (which will have a short but significant release time by virtue of the diode MPA, as will be described), all of the check or match connector operating circuits of FIG. 17 are opened at break contacts MPA-2, MPA-3, MPA-6, MPA-11, etc. These connector circuits come into play later, as will be described. The operated MPA relay closes its make contact MPA-1 in FIG. 14 to parallel break contact CIST-1 in the locking circuit for relay AMBA.

Upon the operation in FIG. 15 of relay ON, in FIG. 14 break contact ON-1 opens the original operating circuit for relay AMBA so that when AMBA is subsequently (hereinafter described) released, the timer TD1 will be protected against a current surge at its terminal 10.

The operation of relay ON of FIG. 15 removes the last ground in FIG. 14 from terminal 11 of timer TD2 to allow this timer to start its 100 ms timing interval. As mentioned earlier, if terminal 11 becomes grounded before timer TD2 times-out, the timer will be recycled. On the other hand, if terminal 11 remains ungrounded for about 100 ms, the operation of relay TA will result in an alarm since the overload circuit should finish all of its functions and be returned to normal within the allotted 100 ms.

TIME-OUT ALARM

If timer TD2 in FIG. 14 should time-out so as to cause the operation of relay TA, the following circuit functions would take place:

1. relay TA locks operated to battery over the make contact of its transfer pair TA–3 and break contact TA KEY–1 of a TA alarm KEY;
2. the locking circuit in FIG. 14 for relay AMBA is opened at break contact TA–2 to release relay AMBA if it is operated and to prevent its locking if advertently operated;
3. the operating circuit in FIG. 14 for relay AMB is opened at break contact TA–1 to release relay AMB if it is operated and to prevent its operation if it is released;
4. the released relay AMB in FIG. 14 keeps timer TD1 normal by grounding terminal 11 of timer at break contacts AMB–1;
5. the operating circuits in FIG. 14 for relays MPO to MP9 are opened by make contacts of the released relay AMBA, thus to recycle timer TD2 by the regrounding of its terminal 11 over the chain of break contacts of relays MP0 to MP9;
6. relays ON and ON1 of FIG. 15 are allowed to release if operated, since all relays MP0 to MP9 will be released;
7. relay MPA of FIG. 15 is locked operated or reoperated by make contact TA–4;
8. relay CIST of FIG. 15 is locked operated or reoperated by make contact TA–5;
9. all relays CI0 to CI9 of FIG. 15 are operated over made contacts CIST–2 to CIST–11 f relay CIST;
10. any operated relays of FIGS. 16 through 23 are released;
11. and, although not shown, an alarm is provided.

In order to retire an alarm condition, the TA KEY is operated to accomplish the following functions:

1. relay TA of FIG. 14 releases;
2. the alarm is extinguished (not shown);
3. relays MPA and CIST of FIG. 15 are released;
4. relays CI0 to CI9 of FIG. 15 are released;
5. and, the overload circuit is thus returned to normal ready for reuse.

In the next section it is assumed that the TA relay of FIG. 14 does not operate to cause the above time-out alarm, such assumption being based on the additional assumption that the overload control circuit performs its functions properly and returns to normal within the allotted time of 100 ms.

MARKER REGISTERS CALLED NUMBER IN OVERLOAD CONTROL

Assuming that timer TD2 of FIG. 14 does not time-out and taking up the discussion subsequent to the above-described seizure of the overload control by marker M1, the marker M1 will proceed to register or record in the overload control the called digits 2489 of the busy called line. The following relays are operated in the overload control, as previously described:

1. in FIG. 14, relays AMB, AMBA and MP1;
2. in FIG. 15, relays ON, ON1 and MPA;
3. and, in FIG. 16, register or record connectors CA1 and CB1.

Circuits are now completed to enable the transfer of the called digits 2489 from FIGS. 10, 11, 12 and 13 of marker M1 to the overload control registers of FIGS. 18 through 23.

Figure 10:
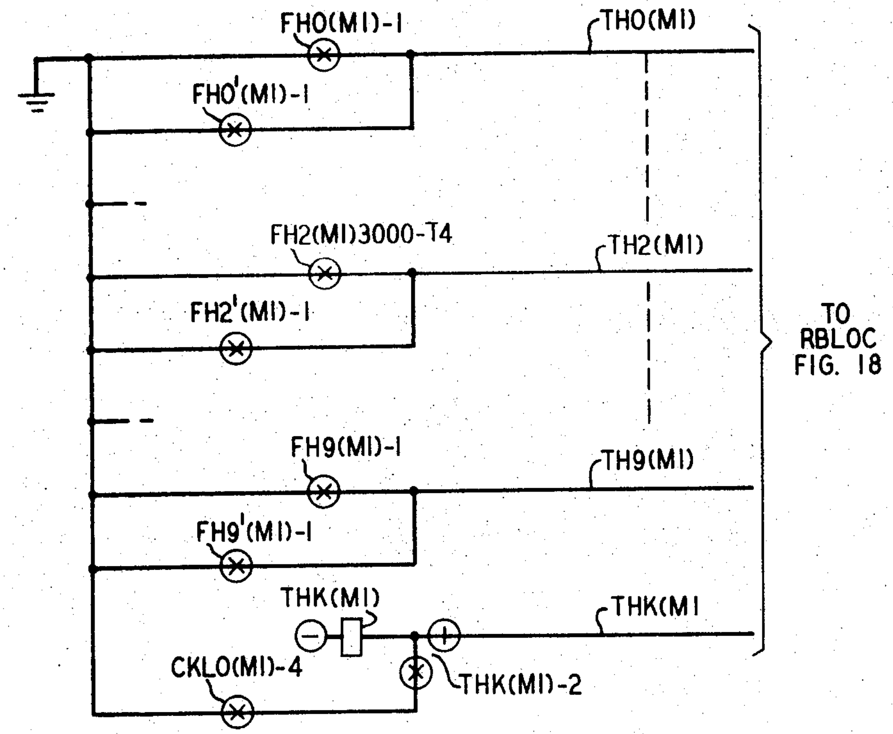
Figure 18:
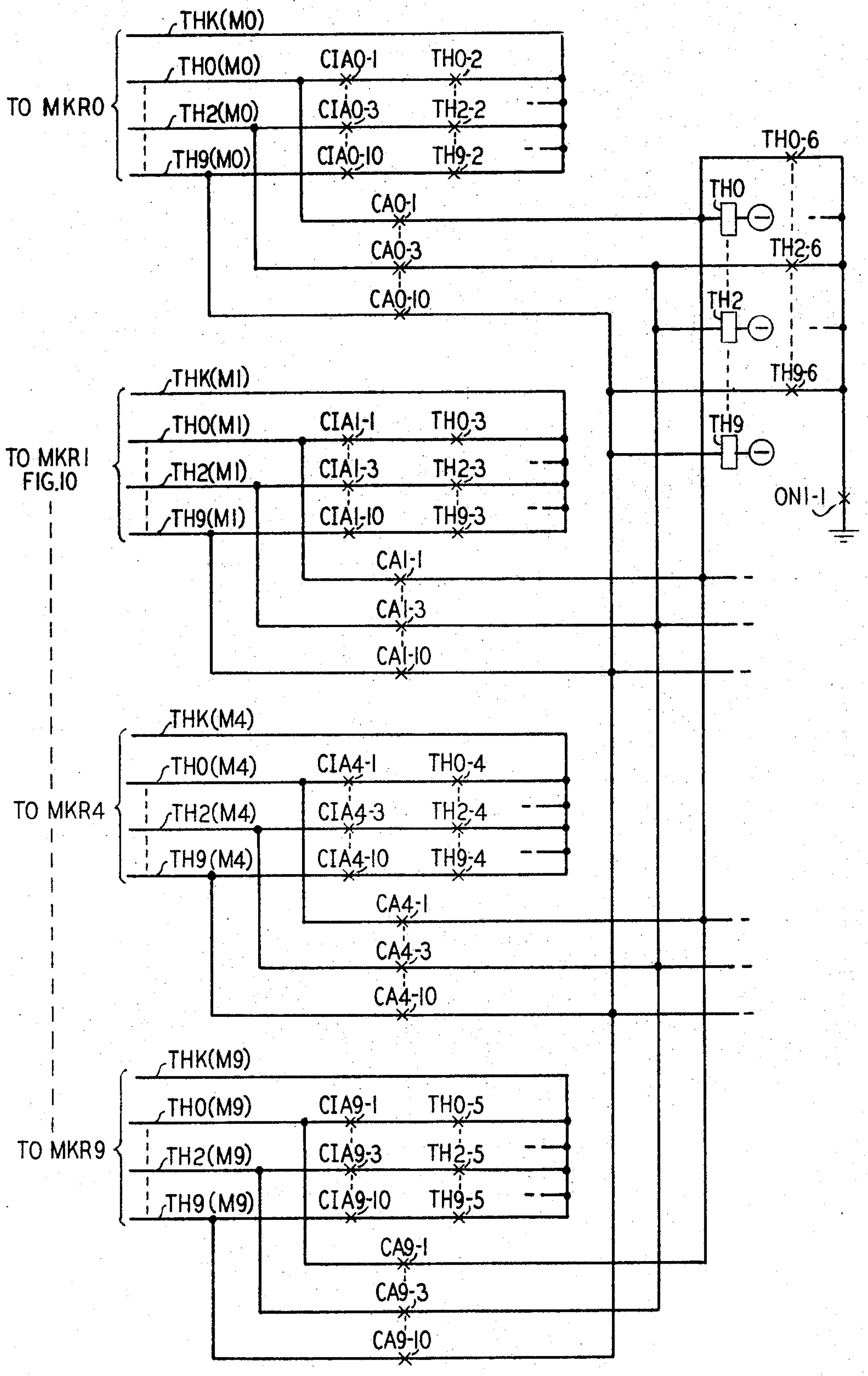

The thousands digit 2 causes the operation in FIG. 18 of relay TH2 in a circuit extending from ground in FIG. 10, over make contact FH2(M1)3000–T4, over lead TH2(M1) to FIG. 18, thence over make contact CA1–3, and to battery through the winding of relay TH2. Relay T2 locks over its make contact TH2–6 to ground over make contact ON1–1.

Figure 19:
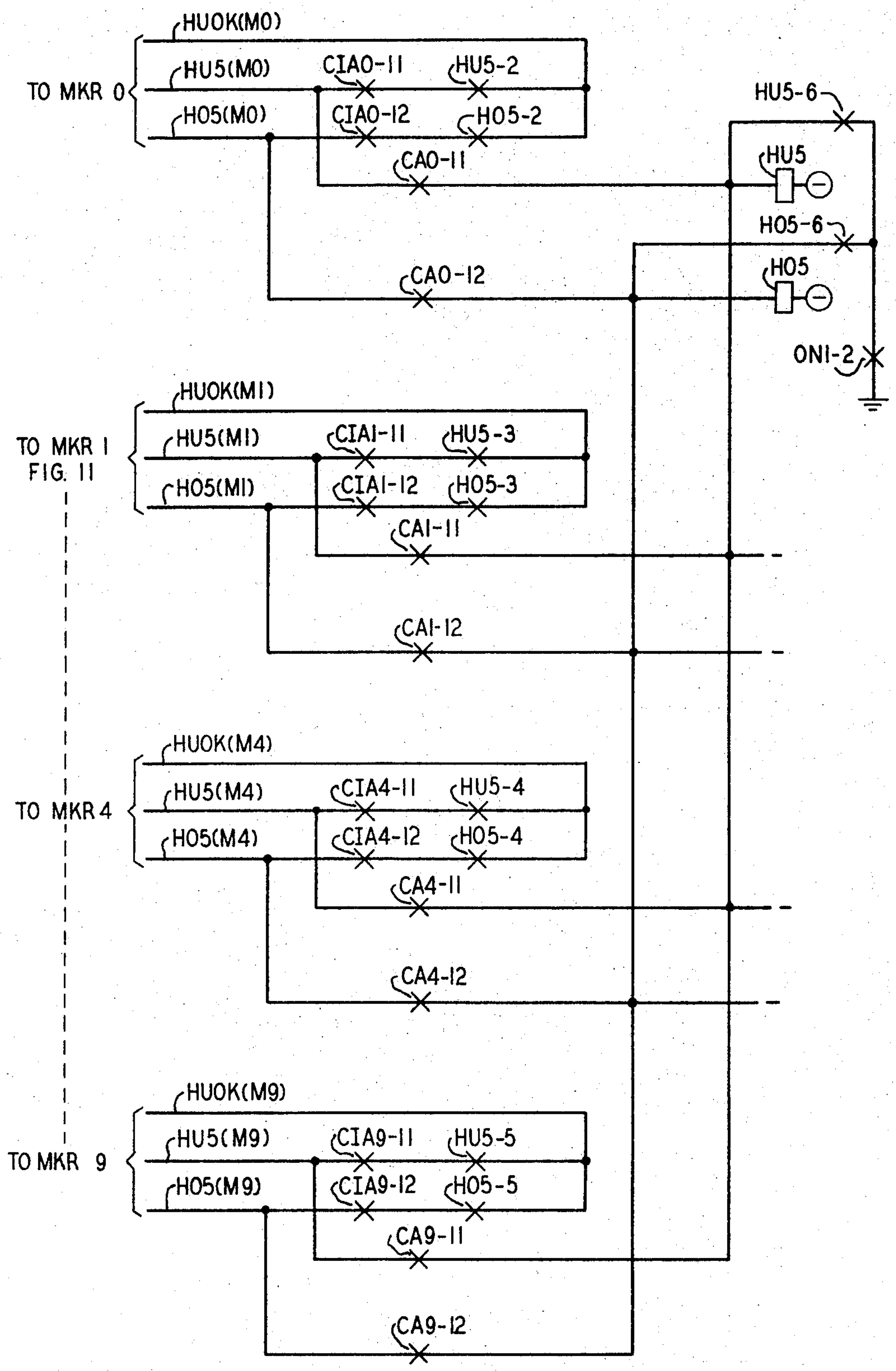
Figure 20:
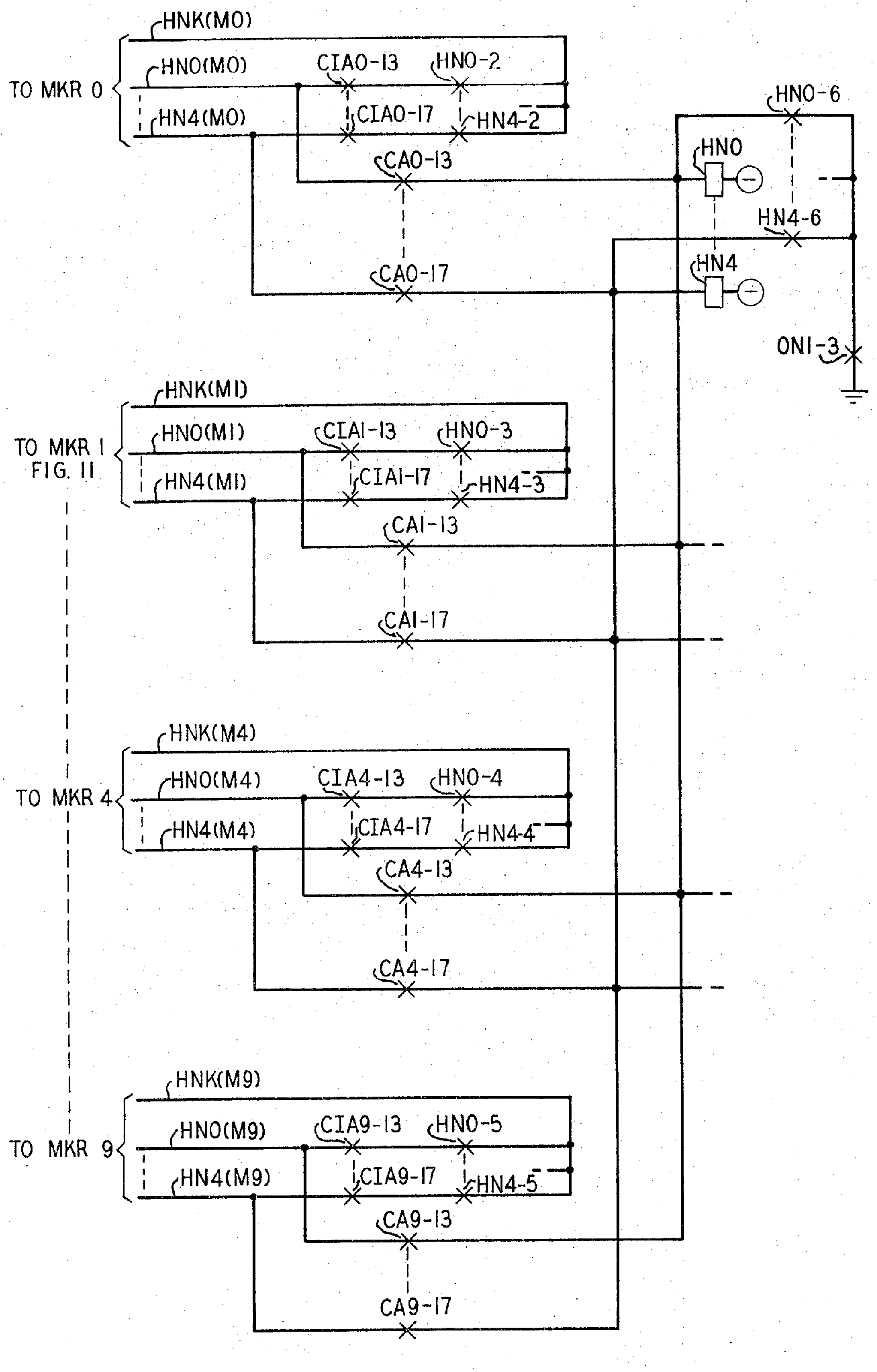

The hundreds digit 4 is registered in FIGS. 19 and 20 by the operations of relay HU5 in FIG. 19 and relay HN4 in FIG. 20. Relay HU5 operates in a circuit extending from ground in FIG. 11, over make contact CKL0(M1)–5 and the break contact of the transfer pair H6(M1)–1 to lead HU5(M1) into FIG. 19, thence over make contact CA1–11 to battery through the winding of relay HU5. Relay HU5 locks over its made contact HU5–6 to ground over make contact ON1–2. Relay HN4 of FIG. 20 operates in a circuit extending from ground in FIG. 11, over make contact HN4(M1)3014–T2 to lead HN4(M1) into FIG. 20, thence over make contact CA1–17 and to battery through the winding of relay HN4. Relay HN4 locks over its make contact HN4–6 to ground over make contact ON1–3.

Figure 21:
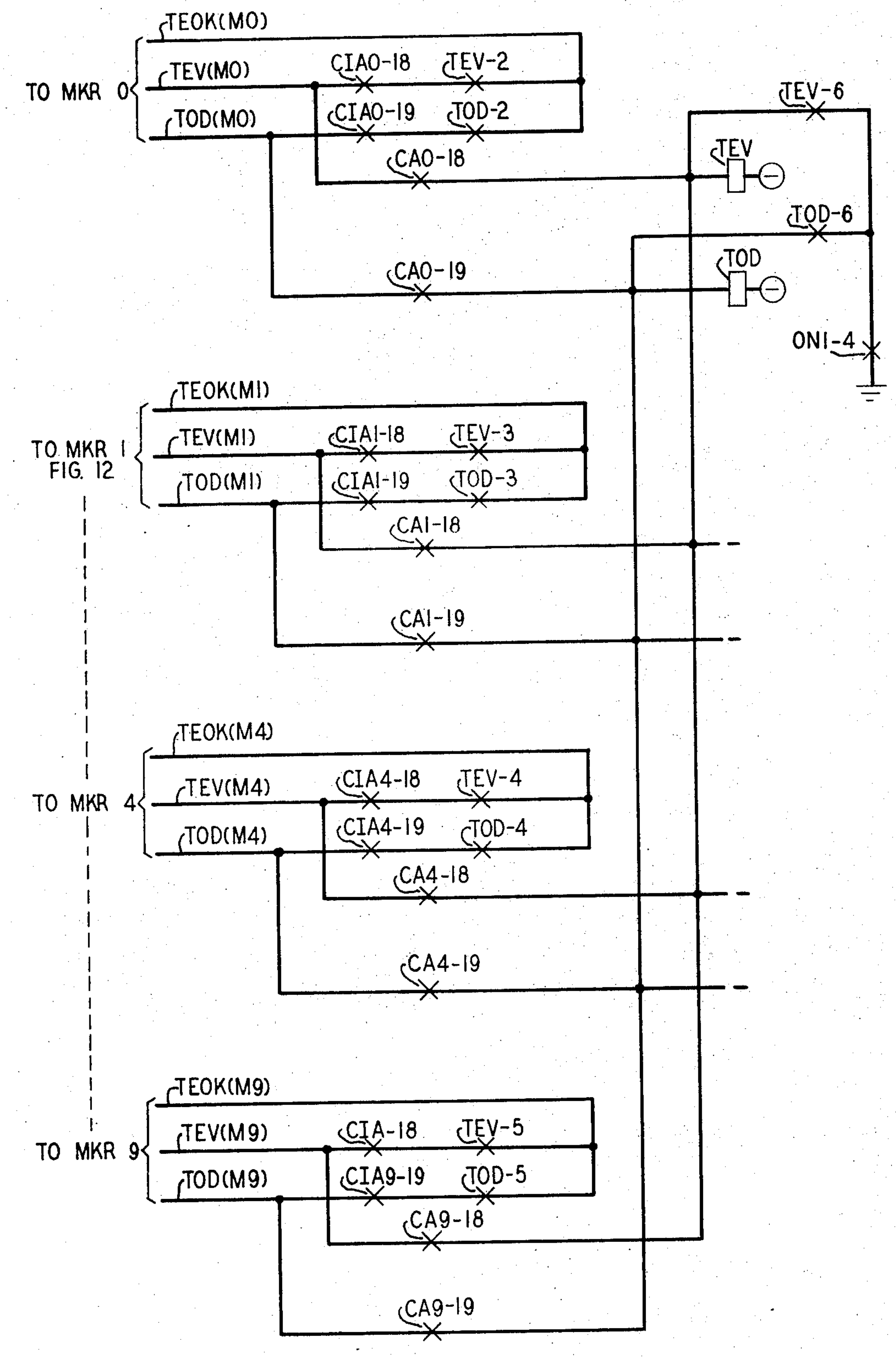
Figure 22:
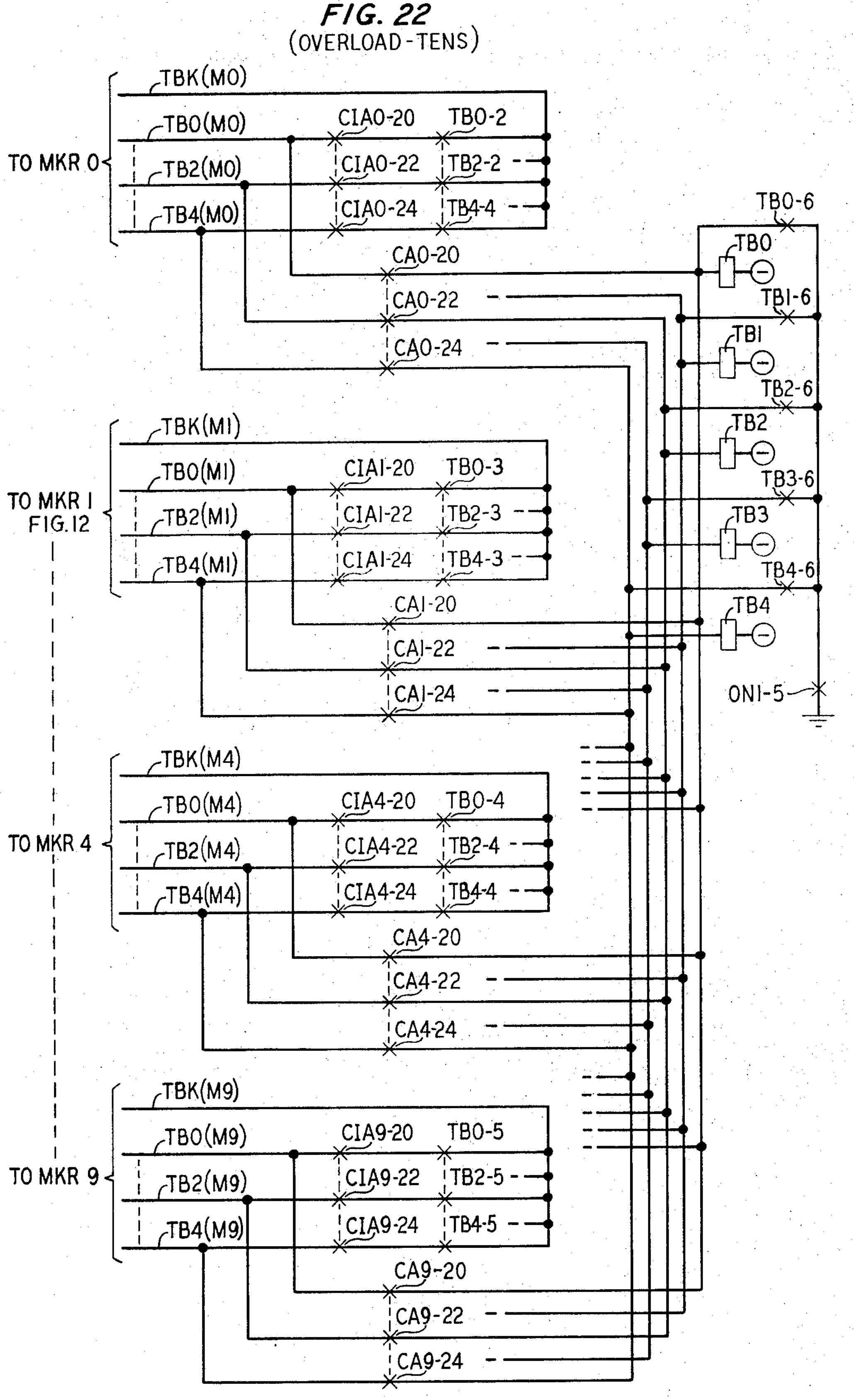

The tens digit 8 is registered in FIG. 21 and 22 by the operations of relay TEV of FIG. 21 and relay TB4 of FIG. 22. Relay TEV of FIG. 21 operates in a circuit extending from ground in FIG. 12, over make contact TEV(M1)1980–T4 to lead TEV(M1) into FIG. 21, thence over make contact CA1–18 to battery through the winding of relay TEV. Relay TEV locks over its make contact TEV–6 to ground over make contact ON1–4. Relay TB4 in FIG. 22 operated in a circuit extending from ground in FIG. 12, over make contact TB4(M1)3605–B3 to lead TB4(M1) into FIG. 22, thence over make contact CA1–24 to battery through the winding of relay TB4. Relay TB4 locks over its make contact TB4–6 to ground over make contact ON-1–5.

Figure 23:
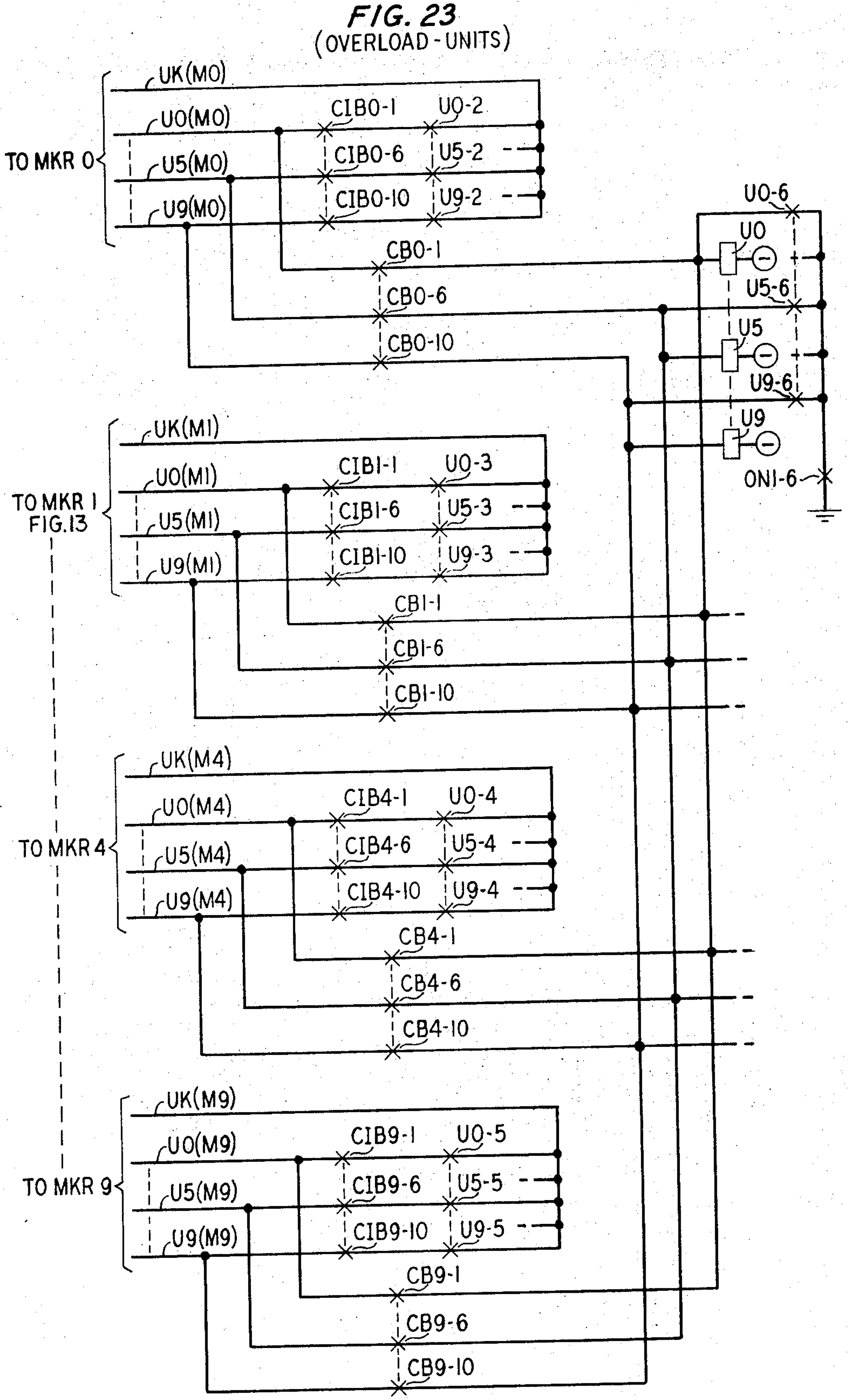

The units digit 9 is registered in FIG. 23 by the operation of relay U9. Relay U9 operates in a circuit extending from ground in FIG. 13, over make contact CKL0(M1)–9, over the make contact of the transfer pair U4′(M1)–2, the break contact of the transfer pair U1′(M1)–2, the break contact of the transfer pair U2′(M1)–1, and the make contact of the transfer pair U5′(M1)–2 to lead U9(M1) into FIG. 23, thence over make contact CB1–10 to battery through the winding of relay U9. Relay U9 locks over its make contact U9–6 to ground over make contact ON1–6.

As a check that the called number has been properly registered in the overload control circuitry of FIGS. 18 through 23, the directory number check relay DNK of FIG. 15 operates in a circuit extending from ground in FIG. 15, thence over make contacts U9–1, TEV–1, TB4–1, HN4–1, HU5–1 and TH2–1 to battery through the winding of relay DNK.

MARKER M1 DISCONNECTS FROM OVERLOAD CONTROL

The operation in FIG. 15 of the directory number check relay DNK initiates circuit functions which result in the opening of connections between marker M1 and the over-load control. The operation of relay DNK closes its make contact DNK–1 in FIG. 14 to reground terminal 11 of timer TD2 to recycle the timer. Also, in FIG. 15 relay CIST operates in an obvious circuit over make contact DNK–2. Relay CIST, in operating, opens at its break contact CIST–1 in FIG. 14 one part of the locking circuit for relay AMBA, which is still locked under control of make contact MPA–1. Upon the operation of relay CIST, an obvious circuit is completed in the bottom of FIG. 15 to cause the operation of all of the relays CI0 to CI9, only relays CI0, CI1, CI4 and CI9 for respective markers M0, M1 and M9 being shown for the sake of brevity. The operations of all of the CI0 to CI9 relays open all of the circuits in the bottom of FIG. 14 whereby the MP0 to MP9 relays are controlled, thus causing the release of relay MP1 and preventing the operation or reoperation of any of those MP0 to MP9 relays.

Upon the release in FIG. 14 of relay MP1 (and any other of relays MP0 and MP2 to MP9), four significant circuit actions take place as follows:

1. another path is completed in FIG. 14 over the back contact chain of the MP0 to MP9 relays to provide another ground to terminal 11 of timer TD2;
2. the operated register connector relays CA1 and CB1 of FIG. 16 for marker M1 are released to open all of the called number registration leads between marker M1 and the overload control register relays of FIG. 18 through 23;
3. the operating circuit in FIG. 15 for the slow-release relay MPA is opened to allow relay MPA to start to release;
4. and, the operating circuit in FIG. 15 for the off-normal relay ON is opened to allow relay ON to start to release.

As mentioned earlier, relay ON of FIG. 15, particularly by virtue of its closed make contact O–3 shorting its lower winding, has a slow-release time of about 200 ms, within which time all markers will have finished their number checking functions, as will be discussed.

Relay MPA of FIG. 15, particularly by virtue of diode MPA across its winding, has a slow-release time sufficient to maintain itself operated until the operated connectors CA1 and CB1 of FIG. 16 can release.

When the connectors CA1 and CB1 of FIG. 16 release, to disconnect marker M1 from the number registers of the overload control circuit, the overload control retains locked therein the called number as previously described.

Eventually (at least after the release of connectors CA1 and CB1 of FIG. 16) relay MPA of FIG. 15 will release to in turn release relay AMBA of FIG. 14. The release of relay AMBA opens its make contacts AMBA–2, AMBA–3 AMBA–6, AMBA–11, etc., in FIG. 14 to thereby open another part of each of the operating circuits for relays MP0 to MP9. In FIG. 14, the release of relay AMBA closes, at the break contact of its transfer pair AMBA–1, part of the circuit whereby relay AMBA is operated from the still fully-turned-on transistor T2 of timer TD1; but, since the off-normal relay ON of FIG. 15 will not have released at this time, the back contact ON–1 prevents reoperation of relay AMBA.

MARKER M1 FINISHES BUSY-BACK SWITCHING FUNCTION

Marker M1, which has been disconnected from the overload control registers, still has its relay NK1(M1)2901 operated in FIG. 4; thus, in the bottom of FIG. 3, break contact NK1(M1)2901–R4 holds open the ground circuit to lead CI1 extending to FIG. 17 of the overload control. As will be seen later, other markers, such as M0 and M2 to M9, which do not have their NK1 relays operated (i.e., have not entered their test modes of operation), will be able, under the proper circumstances, to ground their leads CI0 and CI2 to CI9 into FIG 17.

It will be recalled, upon the operation in marker M1 of its busy-back relays BB(M1)2401 and BBA(M1) of FIG. 9, that in FIG. 4 relays YBA(M1) and YB(M1) were operated and relays NK(M1)2900 and NK1(M1)2901 were locked operated independent of the number group connector MCA(M1)506. Also, upon the operation of relay YB(M1), in FIG. 4 break contact YB(M1)–2 opened the operating circuit for slow-release relay OR1(M1). The time from the operation of relays BB(M1)2401 and BBA(M1) to the release of relay OR1(M1) is about 100 ms to provide enough time for marker M1 to finish its job with the overload control circuit. When relay OR1(M1) eventually releases, its make contact OR1(M1)–1 in FIG. 3 opens the resistance battery supply to lead MP1 into FIG. 14. This removes from lead MP1 in FIG. 14 the "bid" by marker M1 for the services of the overload control.

From the time of the operation of relay BB(M1)2401 in FIG. 9 of marker M1, marker M1 will have initiated its busy-back switching function or mode of operation. As fully described in Dehn et al., the busy-back operation results in busy tone being transmitted rearward toward the calling end of the connection and in the eventual release of marker M1, sender 244, and the number group circuit. When the busy-back function is finished, all of the relays of FIGS. 2 through 13 will be released since marker M1, sender 244 and the number group will have been returned to normal.

OTHER MARKERS IN NUMBER GROUP QUEUEING MODE

Upon the operation in FIG. 15 of relays CI0 to CI9 and upon the release in FIG. 15 of relay MPA, circuits are partly completed in FIG. 17 for each of the markers M0 to M9 to operate its corresponding check connectors CIA0, CIB0 to CIA9, CIB9. Whether a check or match connector is operated or not will depend upon the circuit condition in the corresponding marker. If a marker is in the so-called number group queueing or test start mode, that marker will operate its check connector of FIG. 17; otherwise, the marker will not do so. Being in the number group queueing mode means having a registered called number and being ready to connect to a number group for translation of that called number into line location, class, and busy-idle information; i.e., the called line has not been tested as to its busy-idle condition.

Taking marker M1 for instance, if a called number is registered in marker M1, relay CKL0(M1) of FIG. 4 will be operated and relays NK(M1)2900 and NK1(M1)2901 in FIG. 4 will be released; and, of course, the various control and register relays of the marker will be in various conditions as previously described. Since details are shown for only marker M1, it may be assumed that some other marker has placed a busy called number in the overload control registers and that marker M1 is one of the other markers which will operate their check connectors of FIG. 17.

It will be assumed that marker M1(along with other markers, such as M0, M4 and M9) is in the number group queueing mode with its relay CKL0(M1) operated in FIG. 4 and its relay NK1(M1)2901 released in FIG. 4.

MARKERS OPERATE OVERLOAD CHECK CONNECTORS

With marker M1 in the number group queueing mode, a circuit extends from ground in FIG. 3, over break contact NK1(M1)2901–R4, and over make contact CKL0(M1)–1 to lead CI1 into FIG. 17, thence over break contact MPA–3 and make contact CI1–2 to battery through the windings of connector relays CIA1 and CIB1 fr marker M1, which connectors CIA1 ad CIB1 thereupon operate. Any other markers, such as markers M0, M4 and M9, which are in the number group queueing mode will operate heir check connector relays CIA0 and CIB0, CIA4 and CIB4, CIA9 and CIB9 in similar circuits.

Upon the operation of one or more of the sets of check or match connectors CIA0, CIB0 to CIA9, CIB9 of FIG. 17, the registers of each of the corresponding markers are connected to the register of the overload control circuit so that each such marker can ascertain whether or not its registered called number matches the busy called number then registered in the overload control.

CONNECTED MARKERS COMPARE REGISTERED CALLED NUMBERS

Such details are shown for only marker M1 (of the ten markers M0 to M9), it will first be assumed that marker M1 contains the same registration as the busy called number presently registered in the overload control. This means that the following register relays are operated, as previously described, in marker M1 to register the called digits 2489 and the incoming trunk frame 4:

1. FIG. 2. — relays F4(M1)2913, TH2(M1)3504, H4(M1)3513, T1(M1)3401, T2(M1)3402, T5(M1)3404, U4(M1)3413 and U5(M1)3414;
2. FIG. 4. — relays CKL0(M1) and HP8(M1)2508;
3. FIG. 6. — relays FH2(M1)3000, U4'(M1), U5'(M1) and HN4(M1)3014;
4. and, FIG. 7. — relays TEV(M1)1980 and TB4(M1)3605.

A circuit is completed for operating the thousands number check relay THK(M1) of marker M1 in FIG. 10, the circuit extending from ground in FIG. 10, over make contact FH2(M1)3000–T4 to conductor TH2(M1) into FIG. 18, thence over make contact CIA-1–3 of the check connector for marker M1, make contact TH2–3 of the operated relay TH2 in FIG. 18, thence over lead THK(M1) into FIG. 10, over the break contact of the transfer pair THK(M1)–2, to battery through the winding of relay THK(M1). Relay THK(M1) operates to register in marker M1 a match of the thousands digit 2. The operated relay THK(M1) locks over the make contact of its transfer pair THK(M1)–2 to ground over make contact CKL0(M1)–4.

Figure 11:
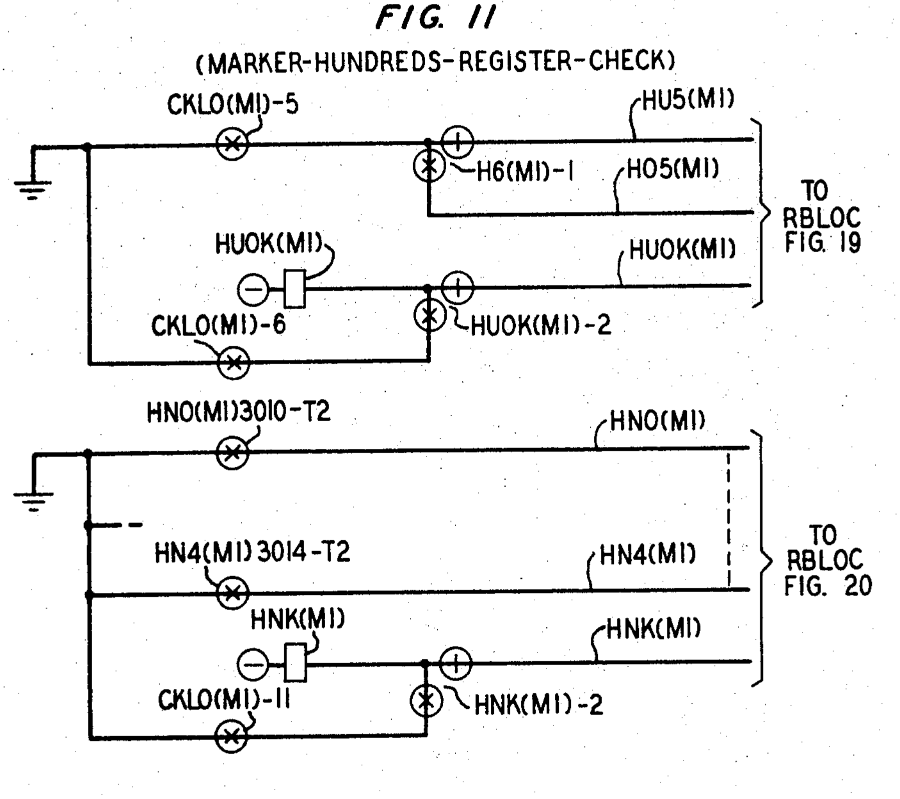

A circuit is completed for operating the hundreds "over and under five" check relay HUOK(M1) of marker M1 in FIG. 11 and the hundreds number check relay HNK(M1) of marker M1 in FIG. 11. The circuit for relay HUOK(M1) extends from ground in FIG. 11, over make contact CKL0(M1)–5, over the break contact of transfer pair H6(M1)–1 to lead HU5(M1) into FIG. 19, thence over make contacts CIA1–11 and HU5–3 to lead HUOK(M1) into FIG. 11, thence over the break contact of transfer pair HUOK(M1)–2 to battery through the winding of relay HUOK(M1). Relay HUOK(M1) locks over the make contact of its transfer pair HUOK(M1)–2 to ground over make contact CKL0(M1)–6. The circuit for relay HNK(M1) extends from ground in FIG. 11, over make contact HN4(M1)3014–T2 to lead HN4(M1) into FIG. 20, thence over make contacts CIA1–17 and HN4–3 to lead HNK(M1) into FIG. 11, over the break contact of transfer pair HNK(M1)–2, to battery through the winding of relay HNK(M1). Relay HNK(M1) locks over the make contact of its transfer pair HNK(M1)–2 to ground over make contact CKL0(M1)–11. The operation of relays HUOK(M1) and HNK(M1) of marker M1 in FIG. 11 registers a match of the hundreds digit 4.

Figure 12:
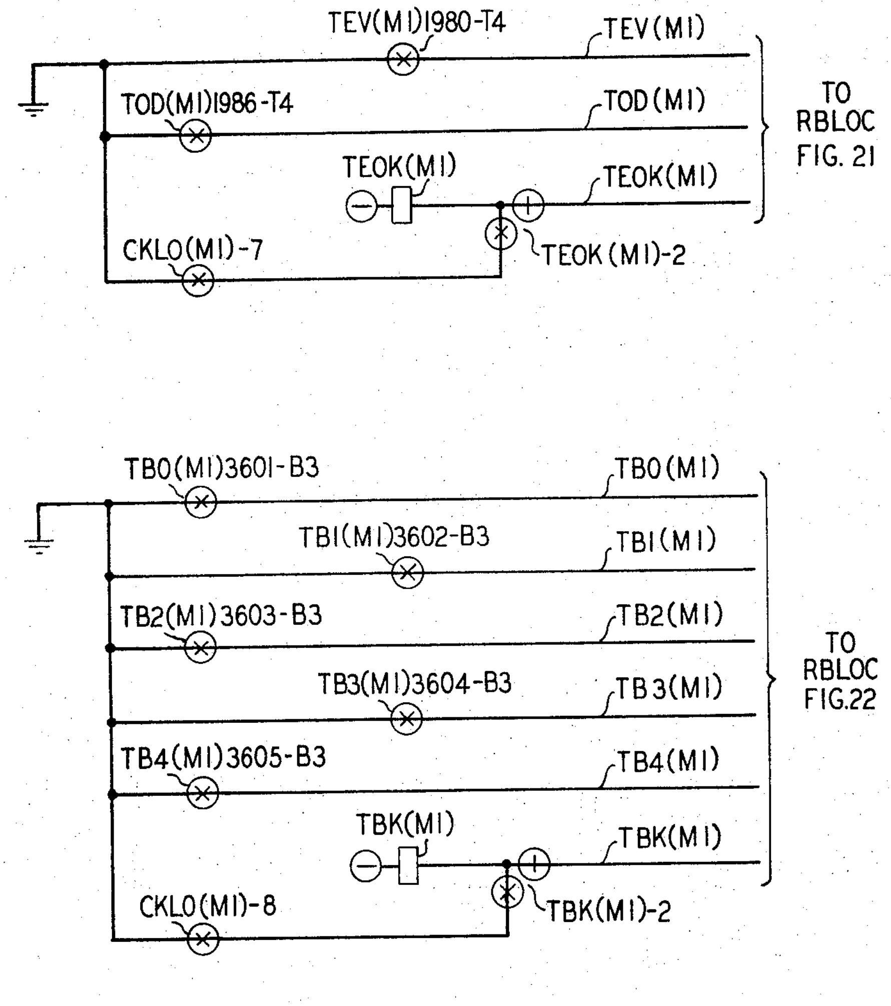

Relays TEOK(M1) and TBK(M1) of marker M1 in FIG. 12 are operated to register a match of the tens digit 8. Relay TEOK(M1) operates in a circuit extending from ground in FIG. 12, over make contact TEV(M1)1980–T4 to lead TEV(M1) into FIG. 21, thence over make contacts CIA1–18 and TEV–3 to lead TEOK(M1) into FIG. 12, thence over the break contact of transfer pair TEOK(M1)–2 to battery through the windings of relay TEOK(M1), which locks over the make contact of its transfer pair TEOK(M-1)–2 to ground over make contact CKL0(M1)–7. Relay TBK operates in a circuit extending from ground in FIG. 12, over make contact TB4(M1)3605–B3 to lead TB4(M1) into FIG. 22, thence over make contacts CIA1–24 and TB4–3 to lead TBK(M1) into FIG. 12, thence over the break contact of transfer pair TBK(M1)–2 to battery through the windings of relay TBK(M1), which locks over the make contact of its transfer pair TBK(M1)–2 to ground over make contact CKL0(M1)–8.

Figure 13:
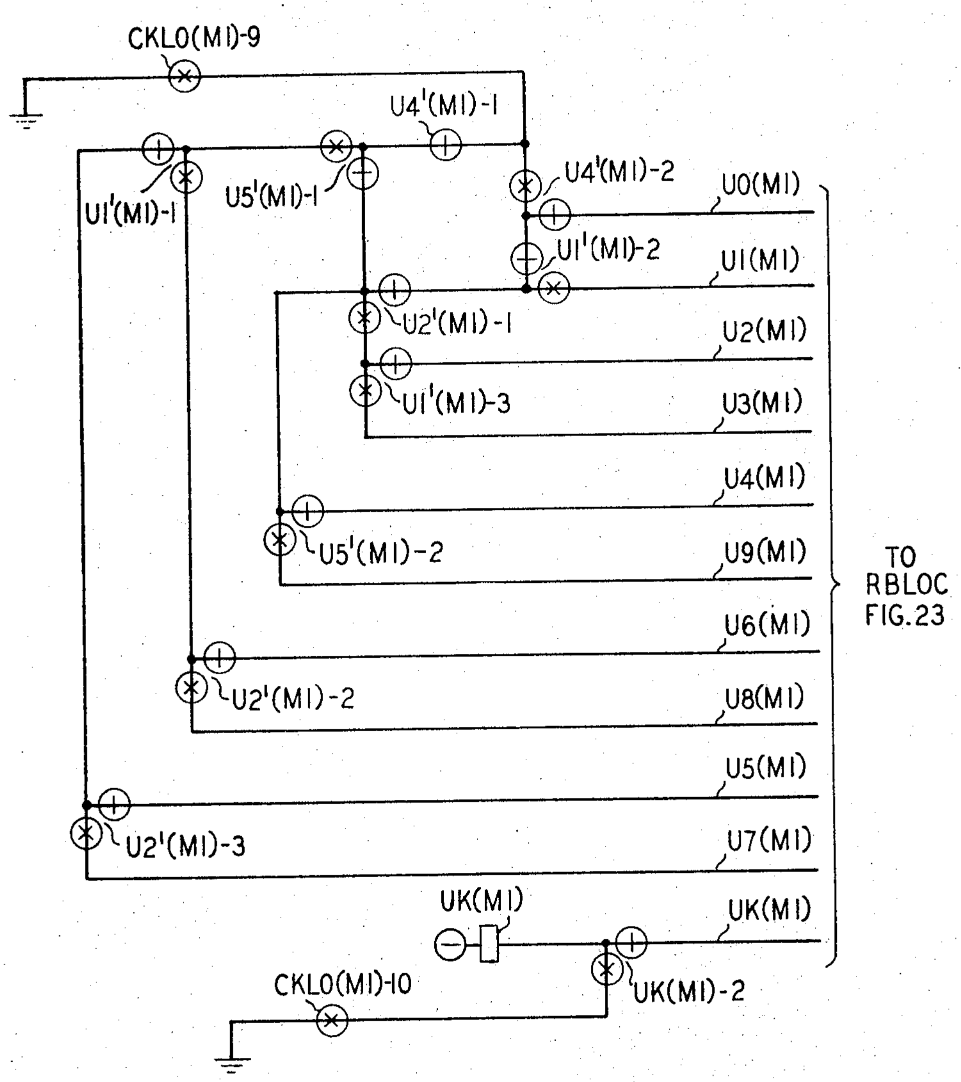

A match of the units digit 9 is indicated by the operation in FIG. 13 of relay UK(M1) in a circuit extending from ground in FIG. 13, over make contact CKL0(M1)–9, the make contact of transfer pair U4'(M1)–2, the break contact of transfer pair U1'(M-1)–2, the break contact of transfer pair U2'(M1)–1, the make contact of transfer pair U5'(M1)–2, lead U9(M1) into FIG. 23, thence over make contacts CIB-1–10 and U9–3 to lead UK(M1) into FIG. 13, thence over the break contact of transfer pair UK(M1)–2 to battery through the winding of relay UK(M1), which locks over the make contact of its transfer pair UK(M-1)–2 to ground over make contact CKL0(M1)–10.

It is thus seen that any marker, such as marker M1, which has operated its check connectors, such as CIA1 and CIB1 of FIG. 17, and which contains a called number which matches the called number 2489 currently registered in the overload control, will have all of its number checking relays operated, such as THK(M1) of FIG. 10, HUOK(M1) and HNK(M1) of FIG. 11, TEOK(M1) an TBK(M1) of FIG. 12 and UK(M1) of FIG. 13.

It is thus also seen that any marker, such as markers M0, and M2 to M9, which fails to find a called number match, will fail to operate at least one of its corresponding number checking relays.

MARKER M1 FINDS NUMBER MATCH

As a result of a match in marker M1 of the busy called number registered in the overload control, as above discussed, a circuit is completed in FIG. 4 to operate the directory number check relay DNK(M1) of marker M1, the circuit extending from ground in FIG. 4, thence over make contacts CKL0(M1)-2, THK(M1)-1, HUOK(M1)-1, HNK(M1)-1, TBK(M1)-1, TEOK(M1)-1 and UK(M1)-1, to battery through the winding of relay DNK(M1).

The operation of relay DNK(M1) in FIG. 4 opens, at its break contact DNK(M1)-1 in FIG. 3, part of the circuit for supplying resistance battery to lead MP1 into FIG. 14. This will prevent marker M1 from attempting to seize the overload control circuit when relay BBA(M1) of FIG. 9 is operated as described below.

Upon the operation of relay DNK(M1), marker M1 is forced into a busy-back condition and its number group queueing mode is canceled. That is, the marker is advanced directly from its test start mode to its busy-back mode without going through its test mode. The busy-back condition is forced by the operation in FIG. 7 of relay ZB(M1); and, the number group queueing mode is canceled by the operation in FIG. 4 of relay NK(M1)2900.

MARKER M1 FORCED TO BUSY-BACK MODE

Upon the operation in FIG. 4 of the directory number check relay DNK(M1), relay ZB(M1) of FIG. 7 operates to force marker M1 into its busy-back switching function. Relay ZB(M1) operates in a circuit extending from ground in FIG. 7, over make contacts CKL0(M1)-3 and DNK(M1)-2, over the break contact of transfer pair ZB(M1)-1, to battery through the winding of relay ZB(M1), which locks over the make contact of its transfer pair ZB(M1)-1 to ground over make contact CK5(M1)2806-B3.

With relay LK(M1)2905 of FIG. 4 released since marker M1 has not proceeded to the line selection switching mode, a circuit is completed in FIG. 9 to force the operation of the busy-back relays BB(M1)2401 and BBA(M1) in marker M1, the circuit extending from ground in FIG. 9, over break contact LK(M1)2905-L5 and make contact ZB(M1)-2 to battery through the windings of relays BB(M1)2401 and BBA(M1).

It is to be noted in FIG. 9, that relay XOB(M1)2839 cannot be operated inadvertently since break contact ZB(M1)-3 of the operated relay ZB(M1) opens the circuit whereby relay XOB(M1)2839 monitors the marker busy-back lead 1110 for false ground.

The operation in FIG. 9 of the busy-back relays BB(M1)2401 and BBA(M1) initiate the usual busy-back switching function, as previously described, but without the necessity of first connecting to a number group circuit to ascertain the busy-idle condition of the called line. The operation of relay BB(M1)2401 causes the operation, as previously described, in FIG. 4 of relays YBA(M1), YB(M1), NK(M1)2900 and NK1(M1)2901. The forced operation of relay NK(M1)2900, etc., simulates to marker M1 a number group connection (simulates the existence of the test mode) so that marker M1 may proceed to its busy-back switching function. Also, relay NK1(M1)2901, in operating opens the circuit at its break contact NK1(M1)2901-R4 in FIG. 3 to lead CI1 into FIG. 17 whereby check connectors CIA1 and CIB1 were operated. Connectors CIA1 and CIB1 then are released.

Eventually, marker M1 will have performed its busy-back switching function and will have released, thus to have released all relays of FIGS. 2 through 13.

OTHER MARKERS

It will be apparent that any other marker M0 and M2 to M9 which finds a number match will also be forced into its busy-back switching mode without such marker needing to connect to a number group circuit.

Any marker which does not find its directory number check relay operated, such as relay DNK(M1) for marker M1 in FIG. 4, will not be forced into its busy-back switching mode and will not have its number group check relays operated, such as relays NK(M1)2900 and NK1(M1)2901 of marker M1 in FIG. 4. That situation will allow each such non-matching marker to proceed with its usual number group seizure for ascertaining during its test mode of operation the location and busy-idle condition of the called line represented by its registered non-matching number.

OVERLOAD CONTROL RETURNS TO NORMAL

It will be recalled from earlier description, when relays CI0 to CI9 of FIG. 15 operate to release any operated relays MP0 to MP9 of FIG. 14, that the slow-release off-normal relay ON of FIG. 15 started to release. Also, it will be recalled that relay ON has a release time of about 200 ms within which all markers will have had sufficient time to compare called numbers with the busy called number registered in the overload control. Eventually, relay ON of FIG. 15 will release to return the overload control to a normal state ready for use, including the release of or the deleting of the registered or recorded busy called line designation.

When relay ON releases, its auxiliary relay ON1 of FIG. 15 also releases, thus to release all of the operated number register relays of FIGS. 18 through 23. The release of the register relays causes the release in FIG. 15 of relays DNK, CIST and any operated relays CI0 to CI9. Also, in FIG. 17, the released relays CI0 to CI9 open parts of the operating circuits for check connectors CIA0, CIB0 to CIA9, CIB9, all of which should have been released or will now release.

At this time, the entire overload control circuitry of FIGS. 14 through 23 will have been released with timer TD2 of FIG. 14 recycled (terminal 11 grounded over break contact ON-2 and over the chain of break contacts MP0-1 to MP9-1) and relay TA released.

If an all-markers-busy condition does not prevail at this time, relay AMB of FIG. 14 will have become released, thus to have recycled timer TD1 (terminal 11 grounded over break contact AMB-1) with relay AMBA released.

If an all-markers-busy condition does prevail at the time of the release of relay ON of FIG. 15, timer TD1 will probably already have timed-out and relay AMBA of FIG. 14 will at once reoperate and lock, thus to cancel the usual 2 to 6 second all-markers-busy timing interval. If timer TD1 is part way through its timing cycle, relay AMBA will reoperate and lock as soon as timer TD1 times-out, if at all.

It is to be understood that the above-described arrangement is illustrative of the application of the principles of the invention. Other arrangements may be devised by those skilled in the art without departing from the spirit and scope of the invention.

For instance, while the exemplary disclosure relates to a particular type of crossbar switching system wherein number group circuits are used to assist terminating markers in testing the busy-idle condition of called lines, it will be apparent that the invention may be applied to other systems using common control circuits which may not need the assistance of other circuitry to effect such testing.

Also, whereas the exemplary embodiment uses an overload control circuit involving electromechanical relay registration and control, it will be obvious that other types of registering or recording, etc., may be used.

Also, as has been mentioned hereinbefore, while the exemplary embodiment sets up as a prerequisite to overload control the requirement that all markers be busy for a prescribed interval of time, such prerequisite is not necessary within the broader aspect of the invention; also, other such prerequisites may be used, and the ones used by example may be modified within the spirit of the invention.

What is claimed is:

1. A switching system having a plurality of lines, each line having an identifying designation; and, a plurality of control circuits; each control circuit comprising means for registering any line designation, means controlled by the registering means for testing the busy-idle condition of the line identified by the registered designation, and means normally operable under the control of the testing means for signifying the busy condition of the tested line; wherein the improvement comprises means controlled by the normal operation of the signifying means of any one control circuit, upon the testing by the one control circuit of any one of the said plurality of lines, for operating the signifying means of any other control circuit having registered therein a line designation
  A. identifying a line untested by the other control circuit
  B. and matching the line designation of the line tested busy by the one control circuit.

2. The invention defined in claim 1 wherein the operating means comprises
  A. means controlled by the one control circuit for recording the line designation of the line tested busy by the one control circuit;
  B. and, means controlled jointly by the recording means and by any other control circuit, having registered therein a line designation identifying a line untested by the other control circuit, for comparing the recorded busy line designation with the line designation registered in the said other control circuit.

3. The invention defined in claim 2 wherein the operating means further comprises means in the said other control circuit controlled by comparing means for operating the signifying means of the said other control circuit if the compared line designations match.

4. The invention defined in claim 3 wherein the recording means comprises
  A. a line designation recorder common to all control circuits,
  B. selectively operable record-connector means,
  C. and means controlled by the one control circuit
    1. for selectively operating the record-connector means to record-connect the common recorder with the said one control circuit
    2. and for recording in the record-connected common recorder the busy line designation registered in the record-connected one control circuit.

5. The invention defined in claim 4 wherein the comparing means comprises
  A. selectively operable match-connector means
  B. and means controlled by any said other control circuit
    1. for selectively operating the match-connector means to match-connect the common recorder with the said other control circuit
    2. and for comparing the busy line designation recorded in the match-connected common recorder with the line designation registered in the match-connected other control circuit.

6. The invention defined in claim 5
  A. wherein means is provided for detecting whenever all control circuits are busy concurrently
  B. and wherein the record-connector means is additionally controlled by the detecting means so that the record-connector means is operable only when all control circuits are busy concurrently.

7. The invention defined in claim 6
  A. wherein the detecting means comprises a busy timer for detecting whenever all control circuits are busy concurrently for a prescribed interval of busy time
  B. and wherein the record-connector means is operable only when all control circuits are busy concurrently for the said prescribed busy time interval.

8. The invention defined in claim 7 wherein the recording means further comprises
  A. a record timer for measuring a prescribed interval of record time beginning with the recording of the busy line designation
  B. and means controlled by the record timer for deleting after the measurement of the prescribed interval of record time.

10. The invention defined in claim 9 wherein the causing means comprises
  A. means controlled by the one control circuit, during the busy-back mode of the said one control circuit, for recording the registered line designation of the line tested busy by the one control circuit;
  B. and, means controlled jointly by the recording means and by any other control circuit, during the test start mode of the said other control circuit, for comparing the recorded busy line designation with the line designation registered in the said other control circuit.

11. The invention defined in claim 10 wherein the causing means further comprises means in the said other control circuit controlled by the comparing means for advancing the said other control circuit directly from the test start mode to the busy-back mode if the compared line designations match.

12. The invention defined in claim 11 wherein the recording means comprises A. a line designation recorder common to all control circuits, B. selectively operable record-connector means, C. and means controlled by the one control circuit 1. for selectively operating the record-connector means to record-connect the common recorder with the one control circuit 2. and for recording in the record-connected common recorder the busy line designation registered in the record-connected one control circuit.

13. The invention defined in claim 12 wherein the comparing means comprises A. selectively operable match-connector means B. and means controlled by any said other control circuit 1. for selectively operating the match-connector means to match-connect the common recorder with said other control circuit 2. and for comparing the busy line designation recorded in the match-connected common recorder with the line designation registered in the match-connected other control circuit.

14. The invention defined in claim 13

A. wherein means is provided for detecting whenever all control circuits are busy concurrently B. and wherein the record-connector means is additionally controlled by the detecting means so that the record-connector means is operable only when all control circuits are busy concurrently.

15. The invention defined in claim 14

A. wherein the detecting means comprises a busy timer for detecting whenever all control circuits are busy concurrently for a prescribed interval of busy time B. and wherein the record-connector means is operable only when all control circuits are busy concurrently for the said prescribed busy time interval.

16. The invention defined in claim 15 wherein the recording means further comprises A. a record timer for measuring a prescribed interval of record time beginning with the recording of the busy line designation B. and means controlled by the record timer for deleting the recorded busy line designation after the measurement of the prescribed interval of record time.

* * * * *

UNITED STATES PATENT OFFICE
CERTIFICATE OF CORRECTION

Patent No. 3,758,724 Dated September 11, 1973

Inventor(s) Frank H. Anderson-Louis J. Cerny-James J. Murphy-John C. Sieglinger

It is certified that error appears in the above-identified patent and that said Letters Patent are hereby corrected as shown below:

switching function with respect to a busy line identified by the registered designation; wherein the improvement comprises means controlled jointly by any one control circuit during the busy-back mode of the one control circuit and by any other control circuit during the test start mode of the other control circuit for causing the other control circuit to advance directly from the test start mode to the busy-back mode if any line designation registered in the other control circuit matches any busy line designation registered in the one control circuit.--.

Signed and sealed this 16th day of April 1974.

(SEAL)
Attest:

EDWARD M.FLETCHER,JR.
Attesting Officer

C. MARSHALL DANN
Commissioner of Patents

M PO-1050 (10-69)

USCOMM-DC 60376-P69
U.S. GOVERNMENT PRINTING OFFICE : 1969 0—366-334